US012710716B2

(12) United States Patent
Ito et al.

(10) Patent No.: US 12,710,716 B2
(45) Date of Patent: Aug. 18, 2026

(54) IMAGE FORMING APPARATUS

(71) Applicant: CANON KABUSHIKI KAISHA, Tokyo (JP)

(72) Inventors: Shingo Ito, Tokyo (JP); Shuichi Tetsuno, Kanagawa (JP); Hiroko Katagiri, Tokyo (JP); Shimpei Ishikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/081,410

(22) Filed: Mar. 17, 2025

(65) Prior Publication Data

US 2025/0298357 A1 Sep. 25, 2025

(30) Foreign Application Priority Data

Mar. 19, 2024 (JP) ................................ 2024-044234

(51) Int. Cl.

| | |
|---|---|
| ***G03G 15/00*** | (2006.01) |
| ***G03G 15/02*** | (2006.01) |
| ***G03G 15/043*** | (2006.01) |
| ***G03G 15/08*** | (2006.01) |
| ***G03G 15/16*** | (2006.01) |

(52) U.S. Cl.

CPC ....... *G03G 15/556* (2013.01); *G03G 15/0266* (2013.01); *G03G 15/043* (2013.01); *G03G 15/0822* (2013.01); *G03G 15/0856* (2013.01); *G03G 15/0865* (2013.01); *G03G 15/0867* (2013.01); *G03G 15/0868* (2013.01); *G03G 15/0877* (2013.01); *G03G 15/0896* (2013.01); *G03G 15/1605* (2013.01); *G03G 15/5016* (2013.01)

(58) Field of Classification Search

CPC ............ G03G 15/556; G03G 15/0266; G03G 15/043; G03G 15/0867; G03G 15/1605; G03G 15/5016; G03G 15/0822; G03G 15/056; G03G 15/0865; G03G 15/0868; G03G 15/0877; G03G 15/0896

See application file for complete search history.

(56) References Cited

U.S. PATENT DOCUMENTS 7,565,085 B2 * 7/2009 Okuyama .......... G03G 15/0872 399/53
11,493,859 B2 11/2022 Funatani et al.
(Continued)

FOREIGN PATENT DOCUMENTS

| | | |
|---|---|---|
| JP | 2004-325875 A | 11/2004 |
| JP | 2020-086450 A | 6/2020 |
| JP | 2023-079462 A | 6/2023 |

*Primary Examiner* — Joseph S Wong
(74) *Attorney, Agent, or Firm* — Venable LLP

(57) ABSTRACT

An image forming apparatus includes a photosensitive member, a toner storage portion, a developing member configured to develop a latent image on the photosensitive member into a toner image, an attachment portion to which a replenishing container containing toner is attached, the attachment portion being configured to allow toner replenishment from the replenishing container into the toner storage portion, and a control unit configured to calculate a toner consumption amount by multiplying a count value correlated with the number of pixels constituting the toner image by a coefficient, the control unit being configured to change a value of the coefficient in a case where the toner replenishment is performed.

20 Claims, 15 Drawing Sheets

(56) References Cited

U.S. PATENT DOCUMENTS

| | | | | |
|---|---|---|---|---|
| 2008/0075482 | A1* | 3/2008 | Hirota ................ | G03G 15/0849 399/30 |
| 2021/0216030 | A1* | 7/2021 | Park .................. | G03G 15/0856 |

* cited by examiner

IMAGE FORMING APPARATUS

BACKGROUND OF THE INVENTION

Field of the Invention

The present invention relates to an image forming apparatus that forms an image on a recording material.

Description of the Related Art

There has been known a replenishment type (toner replenishment type or external replenishment type) in which toner is replenished from the outside of an image forming apparatus into a toner storage portion that stores toner as a developer using a replenishing container inside the image forming apparatus. Japanese Patent Application Publication No. 2020-86450 discloses an image forming apparatus including a developer storage chamber and an attachment port through which a developer supply bottle is attached or detached, the image forming apparatus being configured such that a developer in the developer supply bottle moves into the developer storage chamber by its own weight when the developer supply bottle is attached into the attachment port.

As a method for the control unit of the image forming apparatus to grasp a remaining amount of toner in the toner storage portion, there is a dot count method (also referred to as a pixel count method) in which a toner consumption amount is calculated based on the number of pixels at which a toner image is formed. However, when the toner is replenished, the toner consumption amount calculated by the dot count method may deviate from the actual consumption amount.

SUMMARY OF THE INVENTION

The present embodiment provides an image forming apparatus in which toner consumption amount calculation accuracy can be improved.

According to an aspect of the invention, an image forming apparatus includes a photosensitive member, a toner storage portion configured to store toner, a developing member configured to bear the toner stored in the toner storage portion, supply the toner to the photosensitive member, and develop a latent image on the photosensitive member into a toner image, an attachment portion to which a replenishing container containing toner is attached, the attachment portion being configured to allow toner replenishment from the replenishing container into the toner storage portion in a state where at least a part of the replenishing container is outside the image forming apparatus, and a control unit configured to calculate a toner consumption amount by multiplying a count value correlated with the number of pixels constituting the toner image by a coefficient, the control unit being configured to change a value of the coefficient in a case where the toner replenishment is performed.

Further features of the present invention will become apparent from the following description of exemplary embodiments with reference to the attached drawings.

DESCRIPTION OF THE EMBODIMENTS

Hereinafter, an embodiment according to the present disclosure will be described with reference to the drawings.

First Embodiment

Figure 1A:
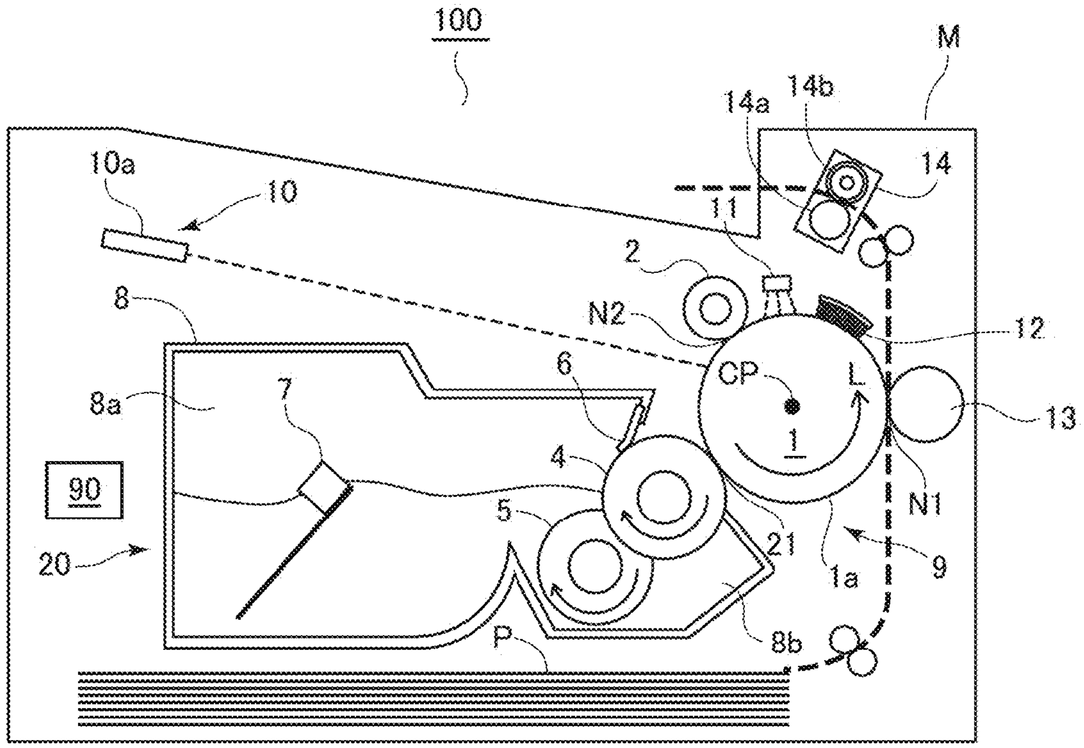
FIG. 1A is a schematic view of an image forming apparatus according to a first embodiment.

A first embodiment of the present disclosure will be described. FIG. 1A is a schematic view illustrating an image forming apparatus 100 according to the first embodiment. The image forming apparatus 100 is an electrophotographic monochrome laser beam printer. The image forming apparatus 100 forms an image on a recording material P based on image data (image information) input from an external computer. As the recording material P (recording medium), various sheet materials that are different in size and material, such as paper such as plain paper and thick paper, a sheet material subjected to surface treatment such as coated paper, a sheet material having a special shape such as an envelope and index paper, a plastic film, and cloth, can be used. The maximum size of the recording material P on which an image can be formed by the image forming apparatus 100 of the present embodiment is a letter size (215.9 mm) having a length in the width direction orthogonal to the recording material conveyance direction.

As illustrated in FIG. 1A, the image forming apparatus 100 includes an apparatus body M, a process unit 9, an exposing unit 10, a transfer roller 13, a fixing unit 14, and a control unit 90. The apparatus body M has a casing including a frame member forming a frame body of the apparatus body M and a cover member forming an outer surface of the apparatus body M. The process unit 9, the exposing unit 10, the transfer roller 13, the fixing unit 14, and the control unit 90 are attached to the apparatus body M.

The process unit 9 may be fixed to the apparatus body M, assuming that, for example, the process unit 9 is not attached or detached by a user. The process unit 9 may be a unit (cartridge) that can be attached or detached from the apparatus body M by the user.

The process unit 9 is a direct transfer type electrophotographic unit. The process unit 9 includes a photosensitive drum 1 and at least one process portion acting on the photosensitive drum 1. The process portion is a unit or a member for executing at least one of the charging, exposing, developing, transferring, neutralizing, and cleaning steps in electrophotography. The process unit 9 of the present embodiment includes a photosensitive drum 1, a charging roller 2 serving as a charging portion, a developing unit 20 serving as a developing portion, a neutralizing unit 11 serving as a neutralizing portion, and a brush member 12.

The photosensitive drum 1 is a photosensitive member (image bearing member) that bears a latent image and a toner image. The photosensitive drum 1 is a photosensitive member that is rotatable about a rotation axis CP and is molded in a cylindrical shape (drum shape). The photosensitive drum 1 of the present embodiment has a photosensitive layer formed of a negatively charged organic photosensitive member on a drum-shaped substrate molded from aluminum. More specifically, the photosensitive drum 1 is a rigid member formed by sequentially applying a resistance layer, an undercoat layer, and a photosensitive layer onto an outer peripheral surface of an aluminum cylinder having a diameter of 24 mm by a dipping coating method. The photosensitive layer includes a charge generation layer and a charge transport layer. The charge transport layer has a film thickness of 22 μm. At the time of image formation, the photosensitive drum 1 is driven to rotate at a predetermined peripheral speed in a direction indicated by arrow L about the rotation axis CP by a motor M1 (FIG. 6) disposed in the apparatus body M. The peripheral speed of the photosensitive drum 1 defines a speed at which the image forming apparatus 100 forms an image, and is therefore referred to as a process speed.

Figure 6:
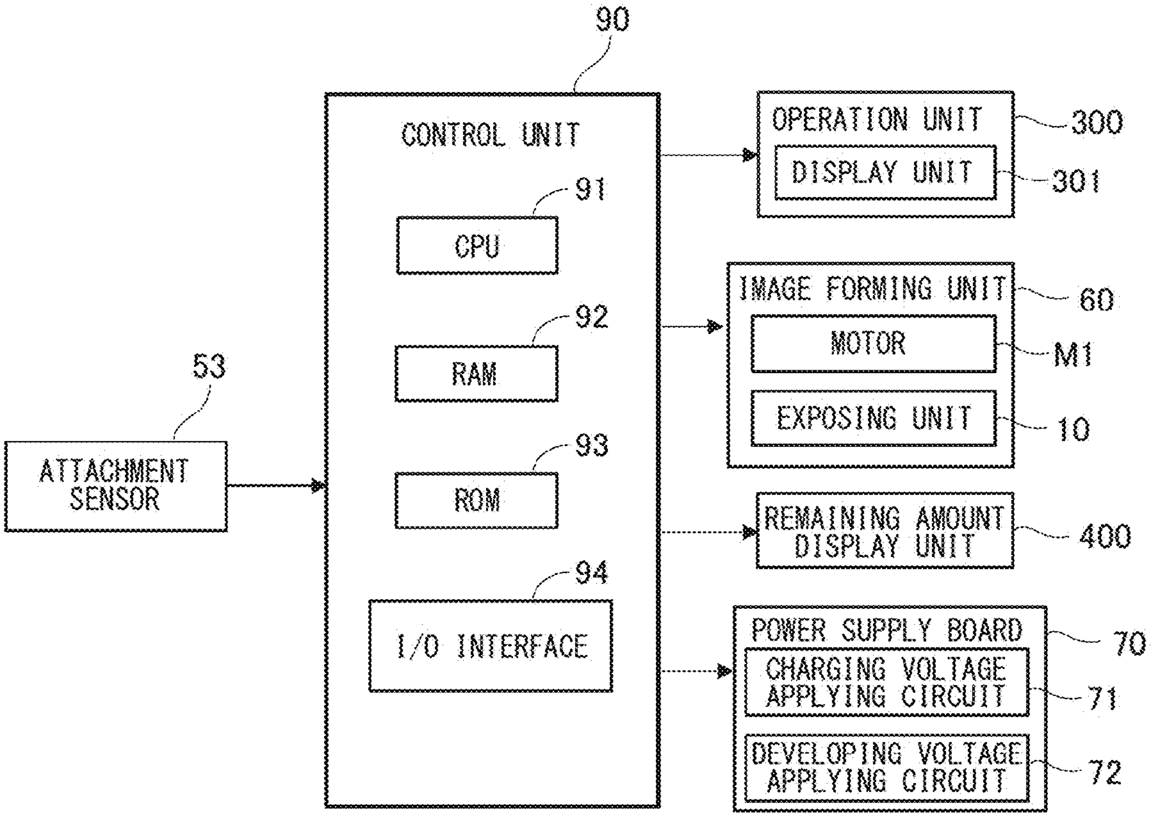
FIG. 6 is a block diagram illustrating a control configuration of the image forming apparatus according to the first embodiment.

The charging roller 2 serving as a charging member is in contact with the photosensitive drum 1 with a predetermined pressure contact force to form a charging portion N2. In addition, the charging roller 2 uniformly charges a surface 1*a* of the photosensitive drum 1 to a predetermined potential by applying a charging voltage from a charging voltage applying circuit 71 (FIG. 6). The surface 1*a* of the photosensitive drum 1 is charged by the charging roller 2 to a pre-exposure potential VD having the same polarity (negative polarity in the present embodiment) as the normal polarity of the toner. For example, a DC voltage of −1400 V is applied to the charging roller 2 of the present embodiment as a charging voltage to charge the surface 1*a* of the photosensitive drum 1 until a surface potential (pre-exposure potential VD) of the photosensitive drum 1 reaches −800 V.

As an example, the charging roller 2 includes a core metal having a diameter of 6 mm, a base layer of hydrin rubber, and a surface layer of urethane, and is formed to have an outer diameter of 12 mm. The charging roller 2 has a resistance of, for example, $1\times10^{6}\Omega$ or less. The charging roller 2 has a hardness of, for example, 70 degrees as a measurement value obtained by an MD-1 rubber hardness meter. Note that the charging voltage in the present embodiment is a direct current (DC) voltage, but may be, for example, a voltage obtained by superimposing an alternating current (AC) voltage on a DC voltage.

The exposing unit 10 is an exposure portion that exposes the photosensitive drum 1. The exposing unit 10 of the present embodiment is a laser scanner unit. That is, the exposing unit 10 includes a light source 10*a* that emits laser light, and a scanning optical system (a polygon mirror, an fθ lens, etc.) that guides the laser light emitted from the light source 10*a* to the photosensitive drum 1 and scans the surface 1*a* of the photosensitive drum 1 with the laser light. The light source 10*a* is a semiconductor laser, and emits, for example, laser light having a wavelength of 800 nm. In addition, the light source 10*a* can change the amount of laser light to be output. Note that the exposing unit 10 is not limited to the laser scanner unit, and for example, an LED exposing unit having an LED array in which a plurality of LEDs are arranged along the rotation axis direction of the photosensitive drum 1 as a light source may be adopted.

The developing unit 20 includes a developing container 8, a developing roller 4, and a supply roller 5. The developing container 8 constitutes a frame body of the developing unit 20. The developing container 8 is an example of a toner storage portion that stores toner as a developer. A storage chamber 8*a* and a developing chamber 8*b* are formed inside the developing container 8 as spaces for accommodating toner. The storage chamber 8*a* and the developing chamber 8*b* communicate with each other to allow toner to move to each other.

The developing roller 4 and the supply roller 5 are rotatably supported by the developing container 8. The developing roller 4 is a developing member (developer bearing member) that carries toner, supplies the toner to the photosensitive drum 1, and develops a latent image on the photosensitive drum 1 into a toner image. The developing roller 4 is disposed in an opening portion of the developing container 8 to face the photosensitive drum 1. A developing portion 21 is formed at a portion where the developing roller 4 and the photosensitive drum 1 face each other. The supply roller 5 abuts on the developing roller 4, and peels off the toner remaining on the developing roller 4 without being transferred to the photosensitive drum 1 by the developing portion 21. The supply roller 5 supplies the toner stored in the developing container 8 to the surface of the developing roller 4. The rotation direction of the supply roller 5 may be a direction (counter direction) in which the moving direction of the surface of the developing roller 4 and the moving direction of the surface of the supply roller 5 are opposite at a portion facing the developing roller 4, or may be a direction (with – direction) in which the supply roller 5 co-rotates with the developing roller 4. The supply roller 5 of the present embodiment rotates in the counter direction with respect to the developing roller 4.

The developing unit 20 of the present embodiment uses a contact developing method as a developing method. That is, a toner layer borne on the developing roller 4 comes into contact with the photosensitive drum 1 in the developing portion 21. A developing voltage is applied from a developing voltage applying circuit 72 (FIG. 6) to the developing roller 4. The developing voltage is, for example, a DC voltage having the same polarity as the normal polarity of the toner. Under the developing voltage, the toner borne on the developing roller 4 is transferred from the developing roller 4 to the surface 1*a* according to a potential distribution of the surface 1*a* of the photosensitive drum 1, thereby developing an electrostatic latent image into a toner image.

In the present embodiment, a reversal development system is adopted. That is, the toner image is developed by the toner adhering to the surface region (exposed region/image region) of the photosensitive drum 1 where the charge amount is attenuated when the surface region of the photosensitive drum 1 is exposed in the exposure step after being charged in the charging step. On the other hand, no toner adheres to the surface region (non-exposed region/non-image region) of the photosensitive drum 1 that has not been exposed in the exposure step, and no toner image is developed.

As an example, the developing roller 4 includes a core metal having a diameter of 6 mm, a base layer formed of silicone rubber on an outer peripheral side of the core metal, and a surface layer formed of urethane rubber on an outer periphery of the base layer, and is formed to have an outer diameter of 15 mm. The developing roller 4 has a resistance value of, for example, $1\times10^4$ to $1\times10^{12}\Omega$. As an example, the supply roller 5 is a sponge roller having conductivity and elasticity and including a core metal having a diameter of 6 mm and a conductive foam layer formed on an outer periphery of the core metal. The supply roller 5 has a resistance value of, for example, $1\times10^4$ to $1\times10^8\Omega$. The hardness of the supply roller 5 can be measured by measuring a load when a flat plate having a width of 50 mm in the rotation axis direction of the supply roller 5 is inserted from the surface of the supply roller 5 by 1 mm toward the rotation axis, and is 200 gf in the present embodiment.

An agitating member 7 is disposed inside the developing container 8. The agitating member 7 is driven by the motor M1 to rotate to agitate the toner in the developing container 8. The agitating member 7 sends toner toward the developing roller 4 and the supply roller 5. In addition, the agitating member 7 has a function of circulating the toner not used for development but peeled off from the developing roller 4 in the developing container 8 to make the toner in the developing container 8 uniform.

A developing blade 6 that regulates the amount of toner borne on the developing roller 4 is disposed at an opening portion of the developing container 8 where the developing roller 4 is disposed. The toner supplied to the surface of the developing roller 4 is uniformly thinned when passing through a portion where the developing roller 4 and the developing blade 6 face each other as the developing roller 4 is rotating, and is charged to a normal polarity (negative polarity) by frictional charging.

As an example, the developing blade 6 is a metal plate (e.g., a stainless plate) having a thickness of 0.1 mm, and a base portion (fixed end) thereof is supported by a support portion provided in the developing container 8. The developing blade 6 is disposed in a posture in which a direction from the base (fixed end) toward a tip (free end) is inclined upstream in the rotation direction of the developing roller 4 so that the tip abuts on the surface of the developing roller 4. The developing blade 6 used in the present embodiment is a sheet metal member processed by cutting a tip of a stainless steel plate (stainless used steel: SUS sheet metal) from a side where a surface abuts on the developing roller 4. The tip portion of the developing blade 6 is bent in the cutting direction by cutting processing.

The transfer roller 13 serving as a transfer unit abuts on the photosensitive drum 1 to form a transfer portion N1 between the transfer roller 13 and the photosensitive drum 1. As an example, the transfer roller 13 includes a core metal having a diameter of 6 mm and a base layer of an ion conductive sponge formed on an outer peripheral side of the core metal in such a manner as to have an outer diameter of 15 mm. The transfer roller 13 has a resistance value of, for example, $4\times10^7\Omega$ in an environment at a temperature of 22° C., and a hardness of 30 degrees as a measurement value obtained by an AskerC rubber hardness meter manufactured by Kobunshi Keiki Co., Ltd. The width of the outer peripheral surface of the transfer roller 13 in the rotation axis direction of the photosensitive drum 1 is substantially equal to the letter size (8.5 inches=215.9 mm).

The neutralizing unit 11 that neutralizes the surface 1*a* of the photosensitive drum 1 is provided downstream of the transfer portion N1 and upstream of the charging portion N2 in the rotation direction (direction indicated by arrow L) of the photosensitive drum 1. More specifically, the neutralizing unit 11 is disposed between the brush member 12 and the charging roller 2 in the rotation direction of the photosensitive drum 1. The neutralizing unit 11 neutralizes the surface potential of the photosensitive drum 1 before reaching the charging portion N2 in order to generate a stable discharge in the charging portion N2.

The brush member 12 is supported by a support member (not illustrated) and its position is fixed. The brush member 12 rubs against the surface of the photosensitive drum 1 while the photosensitive drum 1 is rotating. The brush member 12 collects paper dust transferred from the recording material P onto the photosensitive drum 1 at the transfer portion N1, and reduces the amount of paper dust reaching the charging portion N2 and the developing portion 21 downstream of the brush member 12 in the rotation direction of the photosensitive drum 1.

The fixing unit 14 is of a thermal fixing type in which image fixing processing is performed by heating and melting toner on the recording material P. The fixing unit 14 of the present embodiment includes a fixing film 14*a* serving as a heating member (fixing member), a heater serving as a heat source that heats the heating member, and a pressure roller 14*b* abutting on the fixing film 14*a*. The fixing film 14*a* is a tubular thin film having flexibility. The heater is, for example, a ceramic heater in which a pattern of a heating resistor is printed on a ceramic substrate, and is disposed in the internal space of the fixing film 14*a*. The pressure roller 14*b* is disposed in such a manner that the fixing film 14*a* is sandwiched between the pressure roller 14*b* and the heater. A nip portion (fixing nip) is formed between the fixing film 14*a* and the pressure roller 14*b*.

As the heating member, for example, a cylindrical fixing roller or an endless fixing belt stretched around a plurality of rollers may be used. As the heat source, a halogen heater that generates radiant heat or a coil unit that generates heat from a conductive layer in the heating member by electromagnetic induction may be used.

Image Forming Operation

A series of operations (image forming operation and printing operation) in which the image forming apparatus 100 forms an image on the recording material P using toner while conveying the recording material P will be described. When an image forming command is output to the image forming apparatus 100, an image forming operation is started based on image data input from an external device connected to the image forming apparatus 100.

In the image forming operation, the photosensitive drum 1 is driven by the motor M1 (FIG. 6) and rotated at a predetermined rotation speed (140 rpm in the present embodiment) in the direction indicated by arrow L in FIG. 1A. The charging roller 2 uniformly charges the surface of the rotating photosensitive drum 1 so that the surface potential (pre-exposure potential VD) becomes −800 V. The exposing unit 10 is driven according to a video signal transmitted by the control unit 90 based on the input image data, and irradiates the photosensitive drum 1 with a laser corresponding to the video signal. As a result, an electrostatic latent image is formed on the uniformly charged surface 1*a* of the photosensitive drum 1. In the present embodiment, the exposing unit 10 emits laser light with a light amount of 0.45 $\mu J/cm^2$ so that the post-exposure potential VL (potential in bright portion) of the photosensitive drum 1 becomes −100 V.

On the surface of the developing roller 4, a toner layer is formed by toner charged to a normal polarity. When the developing voltage is applied to the developing roller 4, the toner is transferred from the developing roller 4 to an exposed region of the surface 1*a* of the photosensitive drum 1 in the developing portion 21. As a result, the electrostatic latent image on the surface 1*a* of the photosensitive drum 1 is developed, and a toner image is formed on the surface 1*a* of the photosensitive drum 1. In the present embodiment, a DC voltage of −400 V is applied as a developing voltage to the developing roller 4.

In parallel with the toner image forming process described above, the recording material P stored in the storage portion in a lower portion of the image forming apparatus 100 is fed by a feed roller. The recording material P is conveyed to the transfer portion N1 at the timing when the toner image formed on the photosensitive drum 1 reaches the transfer portion N1. In addition, a transfer voltage is applied to the transfer roller 13 at the timing when the toner image formed on the photosensitive drum 1 reaches the transfer portion N1. As a result, the toner image borne on the photosensitive drum 1 is transferred to the recording material P passing through the transfer portion N1. In the present embodiment, a DC voltage of +1500 Vis applied as a transfer voltage to the transfer roller 13.

The recording material P to which the toner image has been transferred is conveyed to the fixing unit 14. The fixing unit 14 heats and pressurizes the toner image on the recording material P while nipping and conveying the recording material P at the fixing nip. As a result, the toner image is fixed to the recording material P. The recording material P having passed through the fixing unit 14 is discharged to the outside of the image forming apparatus 100 by a sheet discharge roller pair, and is stacked on a sheet discharge tray provided on an upper surface of the apparatus body M.

In the present embodiment, transfer residual toner that is not transferred to the recording material P in the transfer portion N1 and remains on the photosensitive drum 1 is collected in the developing container 8 by the developing roller 4. That is, the present embodiment employs a so-called cleanerless configuration (development-simultaneous cleaning configuration) in which toner that has not been transferred to the recording material P, which is a transfer object, in the transfer portion N1 is collected in the toner storage portion by the developing member.

A surface region of the photosensitive drum 1 after the transfer step receives a transfer current when passing through the transfer portion N1, and accordingly, the surface potential decreases. The surface potential (the potential of the non-exposed region) of the photosensitive drum 1 after the transfer step in the present embodiment is −150 V. The surface region of the photosensitive drum 1 after the transfer step is neutralized by the neutralizing unit 11 so that the remaining surface potential becomes 0 V, and moves toward the charging portion N2.

The transfer residual toner includes a mixture of toner charged to a positive polarity and toner charged to a negative polarity but not having a sufficient charge. The photosensitive drum 1 after being transferred is neutralized by the neutralizing unit 11, and a uniform discharge is generated by the charging roller 2, so that the transfer residual toner can be charged back to the negative polarity. The transfer residual toner charged back to the negative polarity in the charging portion N2 reaches the developing portion 21 as the photosensitive drum 1 is rotating, and is collected in the developing container 8 by the developing roller 4.

That is, the potential (DC component of developing voltage, −400 V) of the developing roller 4 is positive with respect to the surface potential (pre-exposure potential VD, −800 V) in the non-exposed region of the photosensitive drum 1, and is negative with respect to the surface potential (post-exposure potential VL, −100 V) in the exposed region of the photosensitive drum 1. Therefore, the transfer residual toner adhering to the non-exposed region of the photosensitive drum 1 at the time of reaching the developing portion 21 is transferred from the photosensitive drum 1 to the developing roller 4 in the developing portion 21 and collected in the developing container 8. On the other hand, the transfer residual toner adhering to the exposed region of the photosensitive drum 1 at the time of reaching the developing portion 21 is not transferred to the developing roller 4 in the developing portion 21 and remains on the photosensitive drum 1, and forms a toner image together with toner newly supplied from the developing roller 4.

As described above, in the present embodiment, the process unit 9 has a cleanerless configuration in which the transfer residual toner is collected and reused in the developing unit 20. The cleanerless configuration of the process unit 9 eliminates the need for a space for installing a collection container for collecting transfer residual toner and the like, and the size of the image forming apparatus 100 can be further reduced. Further, by reusing the transfer residual toner, the toner consumption rate can be suppressed, and the printing cost can be reduced.

Toner

In the present embodiment, a toner having a particle size of 6 μm with its normal polarity (normal charging polarity)

being a negative polarity is used. The toner of the present embodiment is, for example, a polymerized toner generated by a suspension polymerization method. In addition, the toner of the present embodiment does not contain a magnetic component, and is a so-called non-magnetic one-component developer borne on the developing roller 4 mainly by intermolecular force or electrostatic force (mirror-image force). However, a one-component developer containing a magnetic component may be used as the developer (toner). In addition to the toner particles, the one-component developer may contain an additive (e.g., wax or silica fine particles) for adjusting fluidity and charging performance of the toner. In addition, the toner may contain an organosilicon polymer having a unit structure represented by the following Formula (1) on surfaces of toner particles.

$$R{-}SiO_{3/2} \quad (1)$$

Here, in Formula (1), R is an alkyl group having 1 or more and 6 or less carbon atoms or a phenyl group. By containing the organosilicon polymer, projection portions are formed on the surfaces of the toner particles, and the performance of the toner is improved.

As the developer, a two-component developer containing a non-magnetic toner and a magnetic carrier may be used. When a developer having magnetism is used, for example, a cylindrical developing sleeve in which a magnet is disposed is used as a developer bearing member. In addition, the developing unit 20 may be of a non-contact developing type in which the developing unit 20 is disposed with a predetermined gap from the photosensitive drum 1.

Developing Container and Toner Pack

Figure 2A:
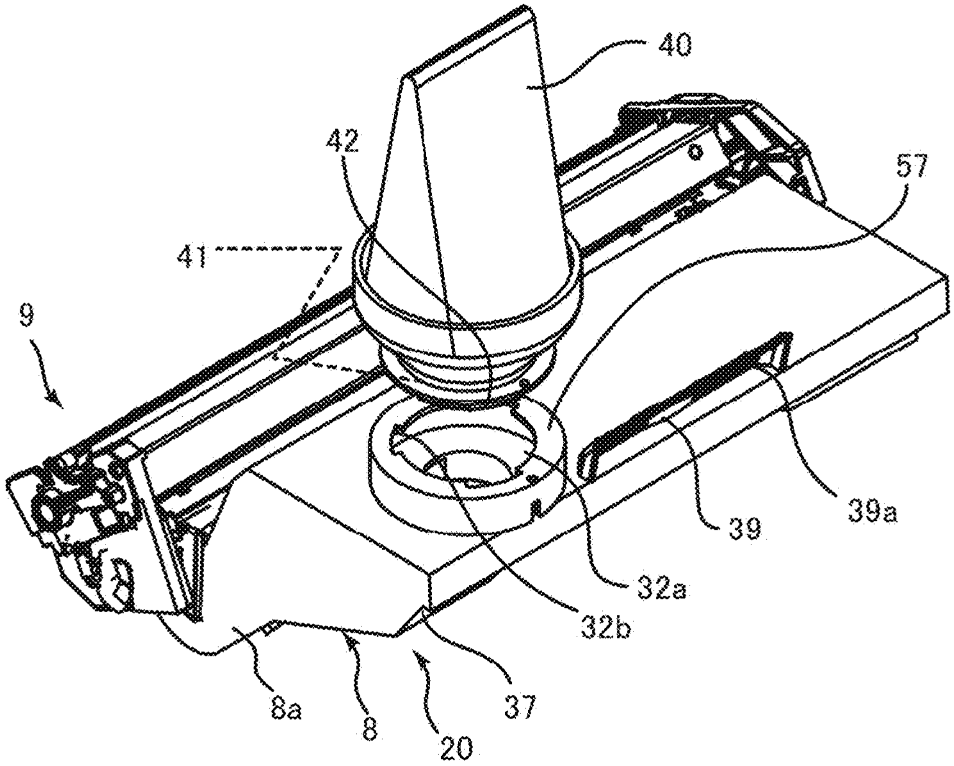
FIG. 2A is a view for explaining a developing container and the toner pack according to the first embodiment.
Figure 2B:
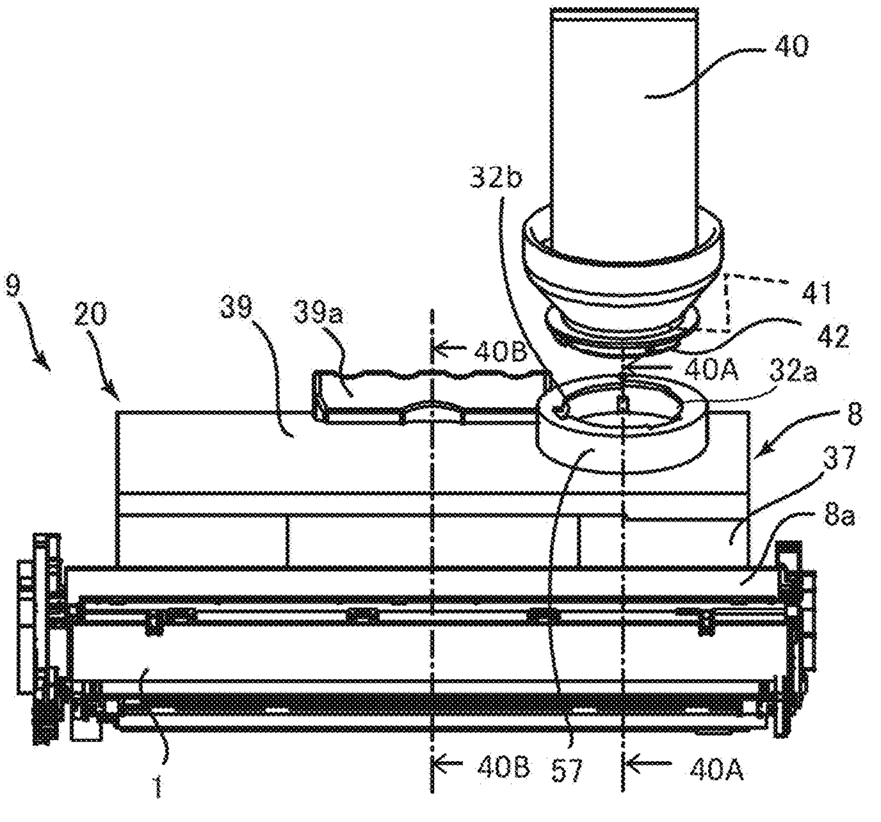
FIG. 2B is a view for explaining the developing container and the toner pack according to the first embodiment.
Figure 3A:
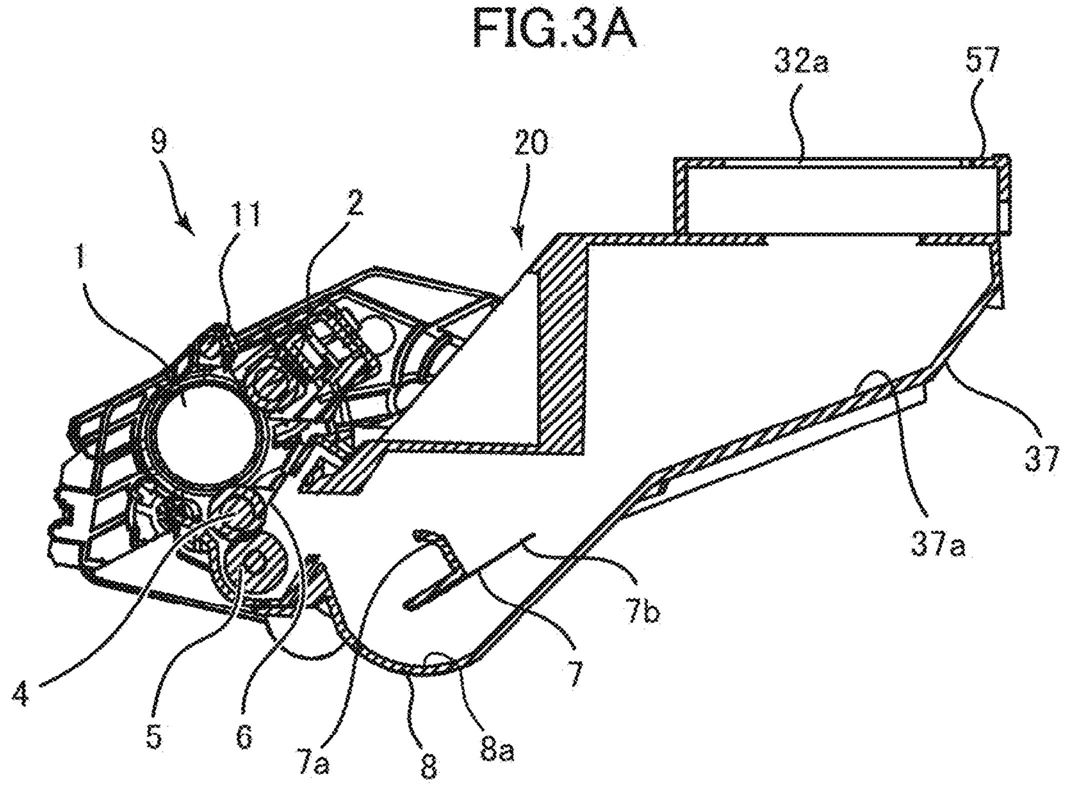
FIG. 3A is a view for explaining the developing container and the toner pack according to the first embodiment.
Figure 3B:
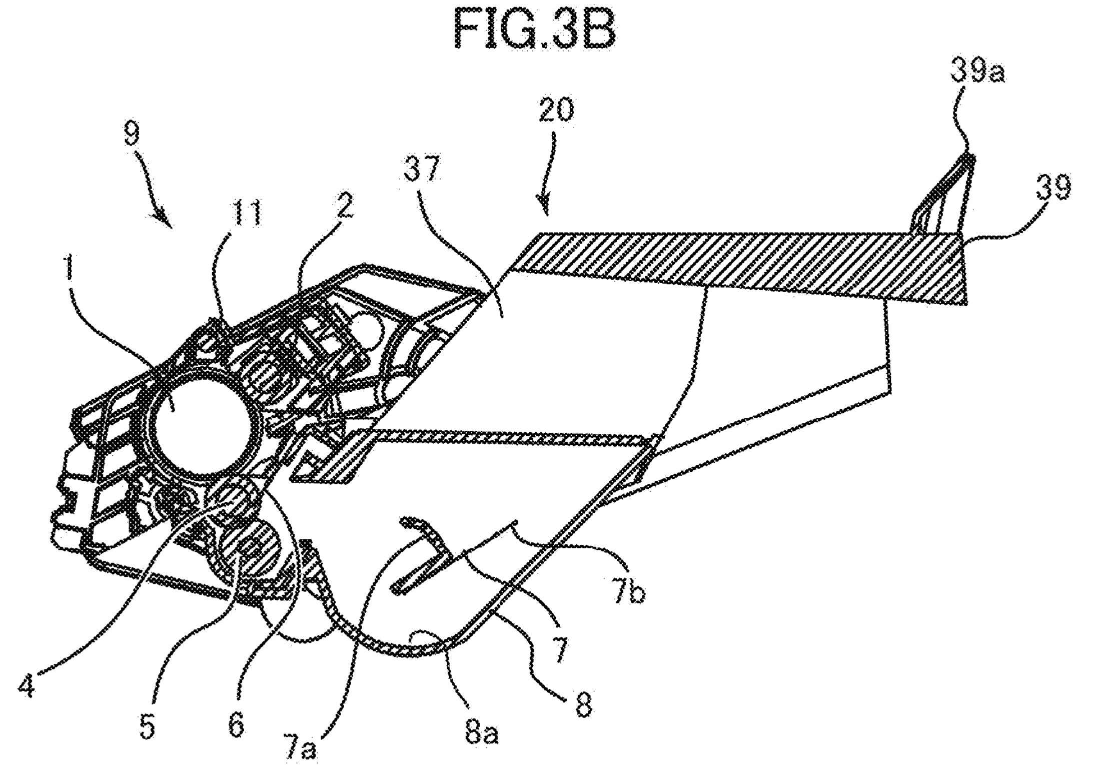
FIG. 3B is a view for explaining the developing container and the toner pack according to the first embodiment.

Next, the developing container 8 and a toner pack 40 serving as a replenishing container in the present embodiment will be described. FIG. 2A is a perspective view illustrating the process unit 9 including the developing container 8 and the toner pack 40, and FIG. 2B is a front view illustrating the process unit 9 and the toner pack 40. FIG. 3A is a cross-sectional view taken along line 40A-40A in FIG. 2B, and FIG. 3B is a cross-sectional view taken along line 40B-40B in FIG. 2B.

As illustrated in FIGS. 2A, 2B, 3A, and 3B, the storage chamber **8*a* of the developing container 8 extends over substantially the entire length of the developing container 8 in the longitudinal direction of the developing unit 20 (the rotation axis direction of the developing roller 4). In addition, the developing container 8 has a protruding portion 37 as a protruding portion that protrudes upward from one end portion of the storage chamber 8*a* in the longitudinal direction and communicates with the storage chamber 8*a***.

An attachment portion 57 to which the toner pack 40 can be attached is provided at an upper end portion (tip portion) of the protruding portion 37. The attachment portion 57 has a replenishing port **32*a* for enabling toner replenishment from the toner pack 40 to the storage chamber 8*a*. When the toner pack 40 is attached to the attachment portion 57, the internal space of the toner pack 40 communicates with the storage chamber 8*a* inside the developing container 8 through the replenishing port 32*a*, allowing a movement of toner from the toner pack 40 to the storage chamber 8*a***.

Figure 1B:
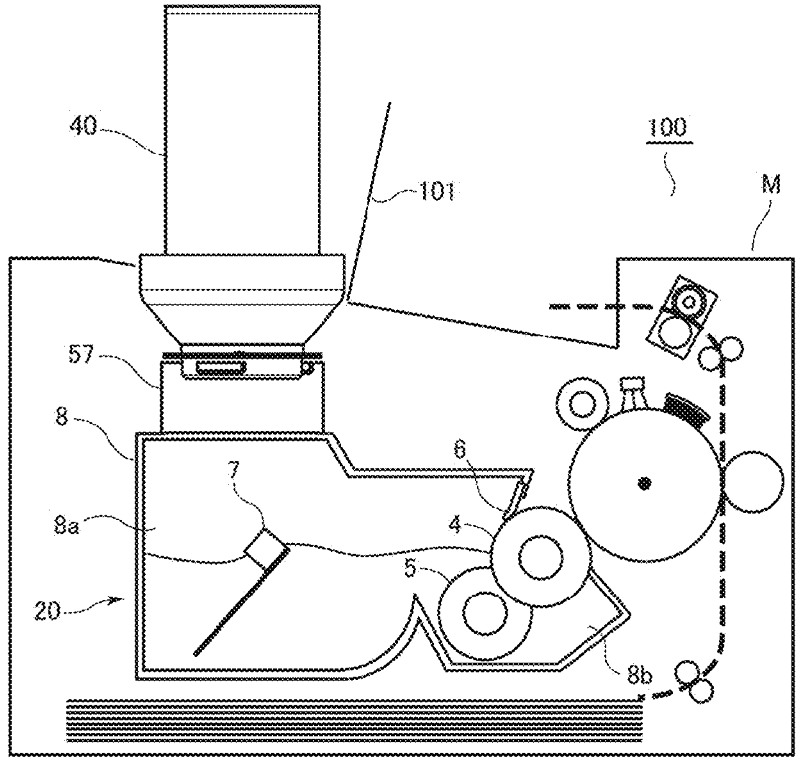
FIG. 1B is a schematic view of the image forming apparatus to which a toner pack is attached according to the first embodiment.

The toner pack 40 is attached to the attachment portion 57 in a state where at least a part of the toner pack 40 is exposed to the outside of the image forming apparatus 100 (see FIG. 1B). For example, the user can expose the attachment portion 57 by opening an opening/closing member 101 provided on the upper surface of the apparatus body M, and attach the toner pack 40 to the attachment portion 57. When the opening/closing member 101 is closed, the attachment portion 57 is covered by the opening/closing member 101. That is, the attachment portion 57 is configured to allow toner replenishment from the toner pack 40 into the developing container 8 in a state where at least a part of the toner pack 40 is outside the image forming apparatus 100. The developing container 8 is configured such that the toner input into the replenishing port **32*a* can reach the agitating member 7 only by its own weight. Here, the expression "by its own weight" means that the toner moves along a path from the replenishing port 32*a* to the agitating member 7 mainly by the action of gravity without receiving a force from a toner conveying member (screw or the like) to which a driving force is supplied from a driving source such as a motor. The agitating member 7 is a rotary member closest to the replenishing port 32*a*, and is disposed to feed the toner in the storage chamber 8*a* toward the developing roller 4 or the supply roller 5** by rotating.

The developing container 8 has a grip portion 39 (FIGS. 2A and 2B). The grip portion 39 has a knob portion **39*a* that can be gripped by a user hooking a finger. The knob portion 39*a* is formed to protrude upward from the top surface of the grip portion 39**.

The protruding portion 37 is formed to be hollow inside, and the replenishing port **32*a* is formed in an upper surface thereof. The replenishing port 32*a* is configured to be connectable to the toner pack 40**.

The toner pack 40 is attachable to and detachable from the attachment portion 57 provided in the protruding portion 37. The toner pack 40 includes a shutter member 41 capable of opening and closing a sheet discharge port of a main body of the toner pack 40, and a plurality of (three in the present embodiment) protrusions 42 formed to correspond to a plurality of (three in the present embodiment) groove portions **32*b* formed in the attachment portion 57. When replenishing toner to the developing container 8, the user attaches the toner pack 40 to the attachment portion 57 by aligning the plurality of protrusions 42 of the toner pack 40 to pass through the plurality of groove portions 32*b* of the attachment portion 57**.

When the toner pack 40 attached to the attachment portion 57 is rotated by 180 degrees, the shutter member 41 of the toner pack 40 abuts against an abutment portion (not illustrated) of the attachment portion 57, thereby rotating with respect to the main body of the toner pack 40 and moving from a closed position to an opened position. The closed position is a position where the shutter member 41 closes the sheet discharge port, and the opened position is a position where the shutter member 41 is retracted to open the sheet discharge port. As a result, the sheet discharge port and the replenishing port **32*a* communicate with each other, and the toner stored in the toner pack 40 flows down into the protruding portion 37 via the sheet discharge port and the replenishing port 32*a*. The shutter member 41 may be provided on the replenishing port 32*a*** side (apparatus body M side).

The protruding portion 37 has an inclined surface **37*a* at a position facing the replenishing port 32*a* in the vertical direction (a position below the replenishing port 32*a*). The inclined surface 37*a* is inclined downward toward the storage chamber 8*a* (toward the rotation axis of the agitating member 7). Therefore, the toner supplied into the developing container 8 through the replenishing port 32*a* is guided to the storage chamber 8*a* by the inclined surface 37*a***.

As illustrated in FIGS. 3A and 3B, the agitating member 7 includes an agitating shaft **7*a* extending in the longitudinal direction of the developing unit 20, and a blade portion 7*b* fixed to the agitating shaft 7*a* and protruding radially outward with respect to the agitating shaft 7***a*. The blade portion 7*b* is a flexible sheet. The agitating member 7 rotates about the agitating shaft 7*a*.

The toner replenished from the replenishing port 32*a* disposed upstream of the agitating member 7 in the conveyance direction is sent toward the developing roller 4 and the supply roller 5 as the agitating member 7 is rotating. The agitating member 7 conveys the toner in a direction from the replenishing port 32*a* toward the developing roller 4 as viewed in the longitudinal direction of the developing unit 20 (the rotation axis direction of the developing roller 4). The agitating member 7 can also convey the toner in the longitudinal direction. The replenishing port 32*a* and the protruding portion 37 are disposed at one end portion of the developing container 8 in the longitudinal direction, but the toner spreads over the entire developing container 8 in the longitudinal direction by repeating the rotation of the agitating member 7. Instead of the agitating member 7 having the agitating shaft 7*a* and the blade portion 7*b*, for example, a spiral agitating member (screw or coil spring) may be used to convey the toner.

Figure 4:
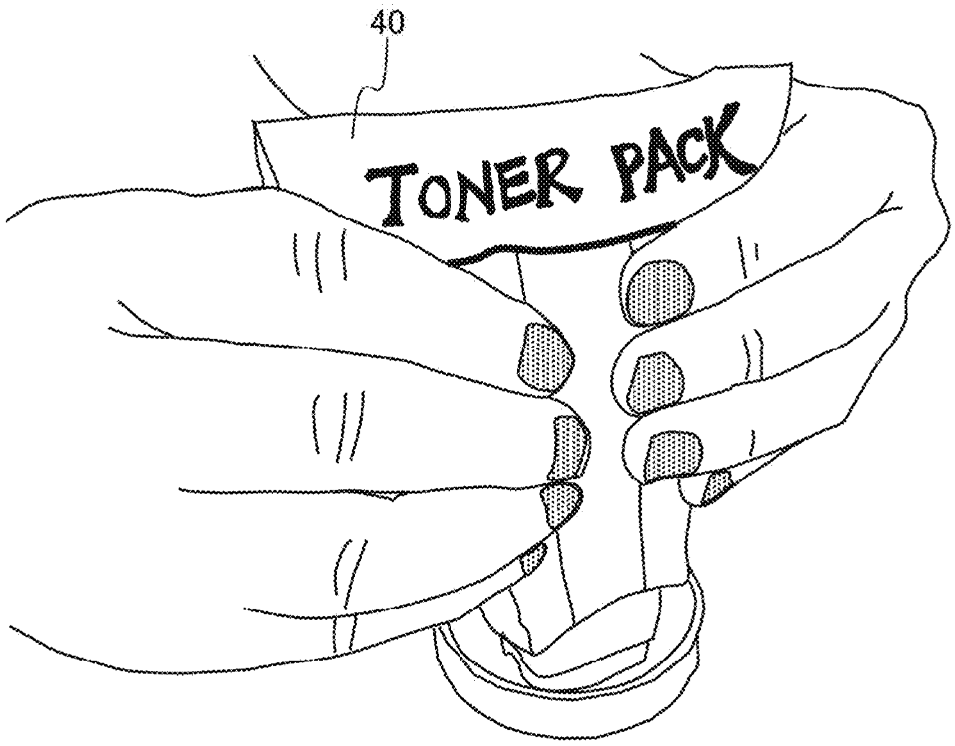
FIG. 4 is a view for explaining the toner pack according to the first embodiment.
Figure 5A:
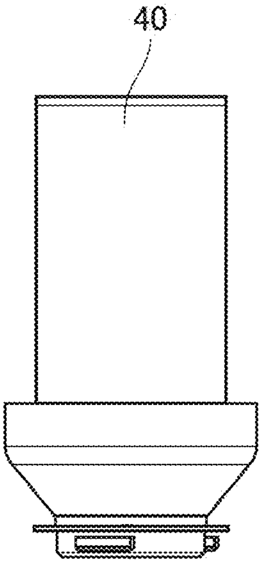
FIG. 5A is a view for explaining the toner pack according to the first embodiment.
Figure 5B:
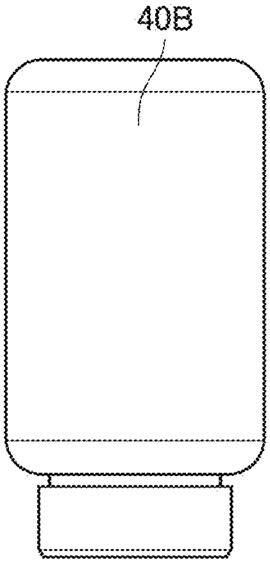
FIG. 5B is a view for explaining the toner pack according to a modification.
Figure 5C:
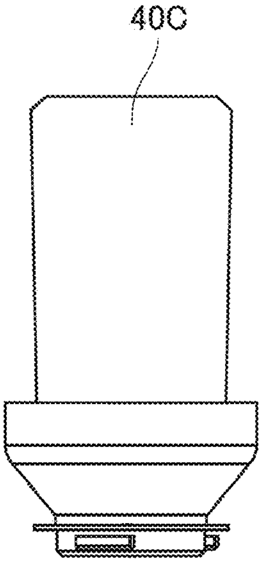
FIG. 5C is a view for explaining the toner pack according to a modification.

As illustrated in FIGS. 4 and 5A, the toner pack 40 serving as a replenishing container of the present embodiment has a toner storage portion formed of a plastic bag member that is easily deformed. The replenishing container is not limited thereto, and for example, a substantially cylindrical bottle container 40B illustrated in FIG. 5B or a paper container 40C illustrated in FIG. 5C may be used. The material and shape of the replenishing container are not particularly limited.

In addition, as a method of discharging the toner from the toner pack, in a case where the replenishing container is a toner pack 40 or a paper container 40C, it is preferable that the user squeezes the toner with his/her fingers, and in a case where the replenishing container is a bottle container 40B, it is preferable that the user taps the container or the like to cause vibrations so that the toner is leaked. In addition, in order to discharge the toner from the bottle container 40B, a discharge mechanism may be provided in the bottle container 40B to discharge the toner without relying on the weight of the toner. The discharge mechanism may be a piston that slides with respect to a cylindrical portion (cylinder portion) of the bottle container 40B. Further, the discharge mechanism may be engaged with the apparatus body M to receive a driving force from the apparatus body M.

In addition, the shutter member 41 may be omitted in any of the replenishing containers (40, 40B, 40C), and a sliding shutter member may be applied instead of the rotary shutter member 41. In addition, the shutter member 41 (sealing member) may be broken by attaching the replenishing container to the attachment portion 57 or rotating the toner pack in the attached state, or may have a detachable lid structure such as a seal.

As described above, in the present embodiment, the toner replenishing type is adopted in which toner can be replenished from the outside of the image forming apparatus 100 to the developing container 8 (toner storage portion) inside the apparatus using the toner pack 40. In a cartridge type, every time toner is depleted, a toner cartridge that stores the toner, the developing unit 20 (developing cartridge) including the developing roller 4, or the process unit 9 (process cartridge) including the photosensitive drum 1 and the developing roller 4 is entirely replaced. On the other hand, in the toner replenishing type, it is only required that toner be replenished into the developing container 8, and the environmental load can be reduced as compared with that in the cartridge type.

Control System of Image Forming Apparatus

FIG. 6 is a block diagram illustrating a control system of the image forming apparatus 100. The image forming apparatus 100 includes a control unit 90 that controls the operation of the image forming apparatus 100. The control unit 90 includes a CPU 91 serving as an arithmetic device, a RAM 92 used as a work area of the CPU 91, and a ROM 93 that stores various programs. In addition, the control unit 90 includes an I/O interface 94 serving as an input/output port connected to an external device.

An attachment sensor 53 is connected to an input side of the control unit 90. The attachment sensor 53 is an example of a detection unit for detecting attachment and detachment (at least one of attachment and detachment) of the toner pack 40 to and from the attachment portion 57. The attachment sensor 53 is, for example, a pressure sensitive switch provided in the replenishing port 32*a* to output a detection signal when pressed by the protrusions 42 of the toner pack 40. When it is detected based on the detection signal of the attachment sensor 53 that the toner pack 40 is detached after the toner pack 40 is attached, the control unit 90 can grasp that toner replenishment has been performed.

The control unit 90 is connected to an operation unit 300, an image forming unit 60, a remaining amount display unit 400, and a power supply board 70. The operation unit 300 (operation panel) includes a display unit 301 such as a liquid crystal panel capable of displaying various setting screens, and an input unit such as a touch panel function of the display unit 301 or a physical key. The image forming unit 60 includes a motor M1 serving as a drive source and an exposing unit 10. The motor M1 of the present embodiment is a common driving source for the photosensitive drum 1, the developing roller 4, the supply roller 5, the agitating member 7, etc. Note that the photosensitive drum 1, the developing roller 4, the supply roller 5, and the agitating member 7 may be driven by separate motors. The exposing unit 10 irradiates the photosensitive drum 1 with laser light modulated based on a video signal transmitted from the control unit 90 to execute an exposure step.

The power supply board 70 is connected to an external commercial power supply to supply power for driving the control unit 90, the motor M1, and the like, and output a high voltage for application to the charging roller 2, the developing roller 4, the transfer roller 13, and the like. The power supply board 70 includes a charging voltage applying circuit 71 (first voltage applying unit) that applies a charging voltage (first voltage) to the charging roller 2, and a developing voltage applying circuit 72 (second voltage applying unit) that applies a developing voltage (second voltage) to the developing roller 4.

Figure 7A:
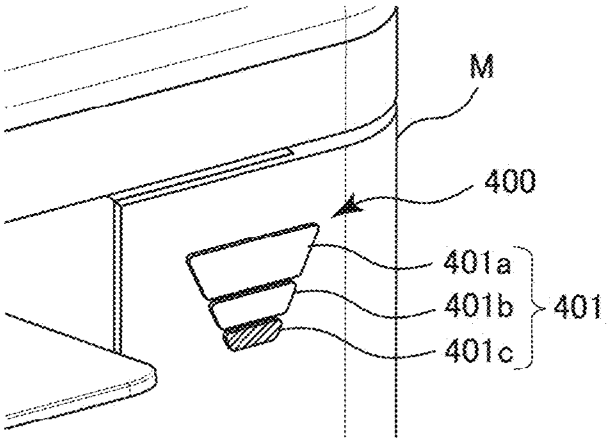
FIG. 7A is a view for explaining a remaining amount display panel according to the first embodiment.
Figure 7B:
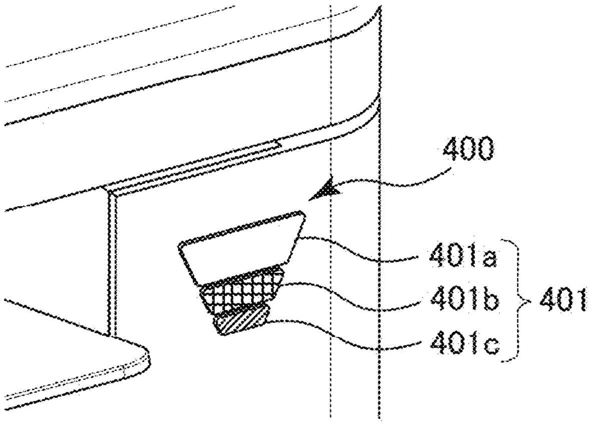
FIG. 7B is a view for explaining the remaining amount display panel according to the first embodiment.
Figure 7C:
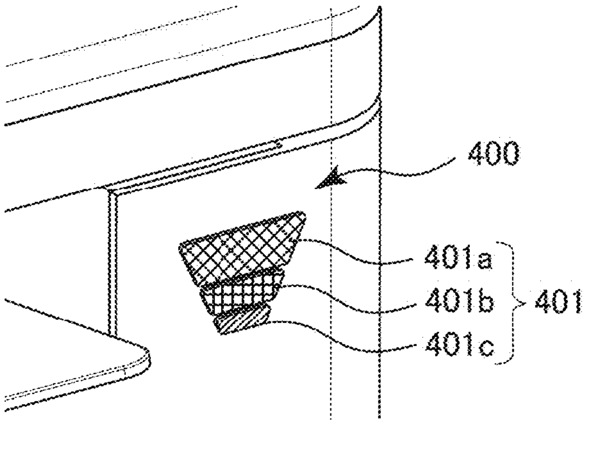
FIG. 7C is a view for explaining the remaining amount display panel according to the first embodiment.

The remaining amount display unit 400 is a display unit that displays information (remaining amount information) related to the remaining toner amount of the developing container 8 (toner storage portion). FIGS. 7A to 7C illustrate a remaining amount display panel 401 as an example of the remaining amount display unit 400. The remaining amount display panel 401 includes a plurality of (three in the present embodiment) lamps 401*a*, 401*b*, and 401*c*. The remaining amount display panel 401 is disposed on, for example, a front surface of the apparatus body M (a surface on the downstream side in the direction in which the recording material is discharged from the apparatus body M). The remaining amount display panel 401 displays information about the remaining amount of toner according to on/off of the plurality of lamps 401*a* to 401*c* or lighting modes of the plurality of lamps 401*a* to 401*c*.

The remaining amount display panel 401 of the present embodiment has a function as a scale (indicator) in which the number of lamps to be turned on increases or decreases according to the remaining toner amount of the developing container 8. The low-stage lamp 401*c* corresponds to the lowest remaining toner amount level (low level) among a plurality of remaining toner amount levels that can be displayed on the remaining amount display panel 401. The middle-stage lamp 401*b* corresponds to a middle remaining toner amount level (mid level), and the high-stage lamp 401*a* corresponds to the highest remaining toner amount level (full level).

That is, when the remaining toner amount of the developing container 8 is equal to or smaller than a first threshold, only the low-stage lamp 401*c* is turned on, and the other lamps 401*a* and 401*b* are turned off as illustrated in FIG. 7A. This display state indicates that the toner in the developing container 8 is almost exhausted (near empty) or that toner can be replenished. For example, by setting the remaining amount display panel 401 to the display state of FIG. 7A, the control unit 90 can execute an operation of notifying the user of information for prompting toner replenishment (toner replenishment notification).

When the remaining toner amount of the developing container 8 is equal to or larger than a second threshold larger than the first threshold, all the lamps 401*a* to 401*c* are turned on as illustrated in FIG. 7C. This display state indicates that the current remaining toner amount is 100% or close to 100% with respect to the amount of toner that can be stored in the developing container 8 (full state). When the remaining toner amount of the developing container 8 is larger than the first threshold and smaller than the second threshold, the low-stage and middle-stage lamps 401*b* and 401*c* are turned on, and the high-stage lamp 401*a* is turned off as illustrated in FIG. 7B. This display state indicates that the toner in the developing container 8 is between the near empty state and the full state.

Note that the specific configuration of the remaining amount display panel 401 and the remaining amount information displaying mode are not limited to those described above. The number of lamps may also be one, two, or four or more. The lighting mode that can be taken by each lamp is not limited to two modes: a turn-on mode and a turn-off mode, and may be a combination of a blinking mode, a light amount changing mode, a light color changing mode, or the like.

Figure 8:
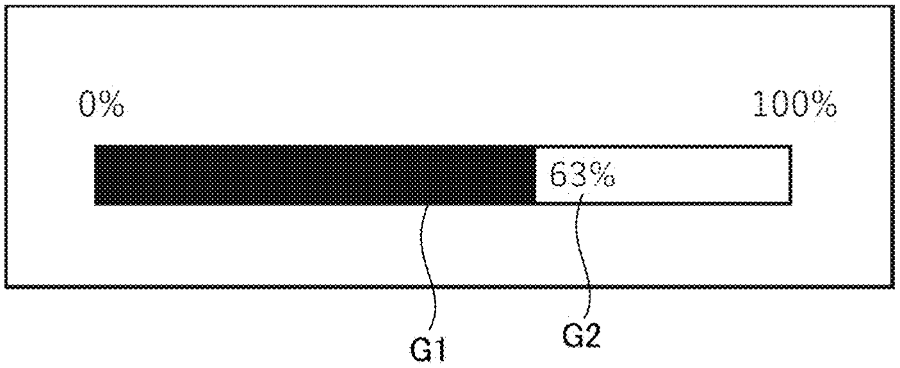
FIG. 8 is an example in which a screen is displayed on a remaining amount display unit according to the first embodiment.

Furthermore, the remaining amount display unit 400 is not limited to the remaining amount display panel 401 using lamps, and may display information regarding the remaining toner amount by displaying a screen (image) as illustrated in FIG. 8. The remaining amount display unit 400 in this case may be the operation unit 300 (operation panel) of the image forming apparatus 100, or may be an external device (such as a user's personal computer) communicably connected to the image forming apparatus 100.

The screen display of FIG. 8 includes a rod-shaped gauge G1 that continuously changes from 0% to 100% and a numerical value G2 (63%) representing the remaining toner amount as remaining amount information indicating the remaining toner amount of the developing container 8. The illustrated example indicates that the remaining toner amount is 63%. That is, in the present embodiment, the remaining amount of toner changes from 100% to 0% as the toner is consumed. The remaining amount information displayed on the screen by the remaining amount display unit 400 is not limited thereto, and only one of the gauge G1 and the numerical value G2 may be displayed. In addition, for example, instead of the gauge G1, an image that changes stepwise according to the remaining toner amount level may be used. In addition, the control unit 90 can execute a toner replenishment notification using the operation unit 300. The information displayed on the display unit 301 of the operation unit 300 in the toner replenishment notification may be, for example, a text message, a voice message, or a buzzer sound. In addition, the remaining amount of toner may continuously change from 0% to 100% based on the toner usage amount (toner consumption amount).

Dot Count Method

The control unit 90 according to the present embodiment calculates a toner consumption amount and a remaining toner amount of the developing container 8 by a dot count method (pixel count method). The dot count method is a method by which, based on a count value (hereinafter referred to as a dot count value) corresponding to the number of pixels constituting an image formed on the recording material P, a toner consumption amount when the image is formed or a remaining toner amount after image formation is calculated.

As a mechanism by which the control unit 90 of the image forming apparatus 100 grasps a remaining toner amount, there is a method using a sensor for detecting a remaining toner amount (a sensor method and a hardware detection method) as well as the dot count method in which a remaining toner amount is calculated by software. The types of sensors include a light detection type, a capacitance type, a weight type, and the like. The dot count method is superior to the sensor method in that the cost is low, there is no restriction on the hardware configuration, and the calculation accuracy does not depend on the magnitude of the remaining toner amount. Here, the control unit 90 performs image processing by analyzing image data received from the outside and developing the image data into a raster image which is data in a raster format. Based on the developed raster image, the control unit 90 transmits a video signal, which is a time-series signal that specifies whether to expose each pixel and the amount of light during exposure, to the exposing unit 10. The exposing unit 10 exposes or does not expose an area corresponding to each pixel on the photosensitive drum 1 with a light amount corresponding to the value of the video signal.

The dot count value may be calculated using data or a signal at any stage in the image forming operation as long as the dot count value is a numerical value correlated with the number of pixels constituting the image formed on the recording material P. In the present embodiment, based on the raster image developed by the control unit 90, the number of dots constituting the raster image (the number of pixels with which the toner image is to be developed, the number of print pixels) is set as the dot count value.

Not limited thereto, the dot count value may be a numerical value indicating the cumulative number of times light is emitted or a cumulative light emission time of the light source 10*a* in the exposing unit 10. For example, the light emission of a laser element, which is the light source 10*a* of the exposing unit 10 in the present embodiment, may be monitored, and a count result of a counter (counting circuit) that counts the number of pixels at which the laser element emits light may be used as the dot count value. The counter may be provided on a semiconductor substrate that drives the laser element (that is, as a part of the exposing unit 10). Furthermore, the counter may be provided in the control unit 90 to calculate an integrated value of values of video signals transmitted to the exposing unit 10. A value obtained by measuring the cumulative light emission time of the laser element may be used as the dot count value.

In addition, the dot count value may be counted as a binary value of "0 (toner image is not developed)" or "1 (toner image is developed)" per pixel, or the maximum count value per pixel may be allowed to be larger than 1. For example, in a case where the amount of exposure light for one pixel is controlled to one of the five stages of increments of 20% from 0% to 100% by turning on/off the light source 10*a* for each area obtained by dividing one pixel into four areas, the count per pixel is set to one of the five stages of increments of 1 from "0" to "4". In this case, the maximum value of the dot count value when one image is printed is four times the number of pixels in the effective image area (the maximum area where a toner image can be formed on the photosensitive drum 1). Furthermore, for example, the count per pixel may be allowed to be a decimal number.

Furthermore, the dot count value may be, for example, a value obtained by sampling and counting some of data to be counted (the number of dots in a raster image or the cumulative number of times light is emitted by the light source 10*a*) in order to reduce the processing load. That is, the dot count value does not need to strictly coincide with the number of pixels constituting an image to be formed on the recording material P, and only needs to be calculated as a numerical value correlated with the number of pixels constituting the image to be formed on the recording material P.

In the present embodiment, the control unit 90 can calculate a dot count value. However, the counting circuit that calculates the dot count value may be arranged in a circuit different from the control unit 90.

Remaining Toner Amount and Remaining Toner Amount Indication

Figure 9A:
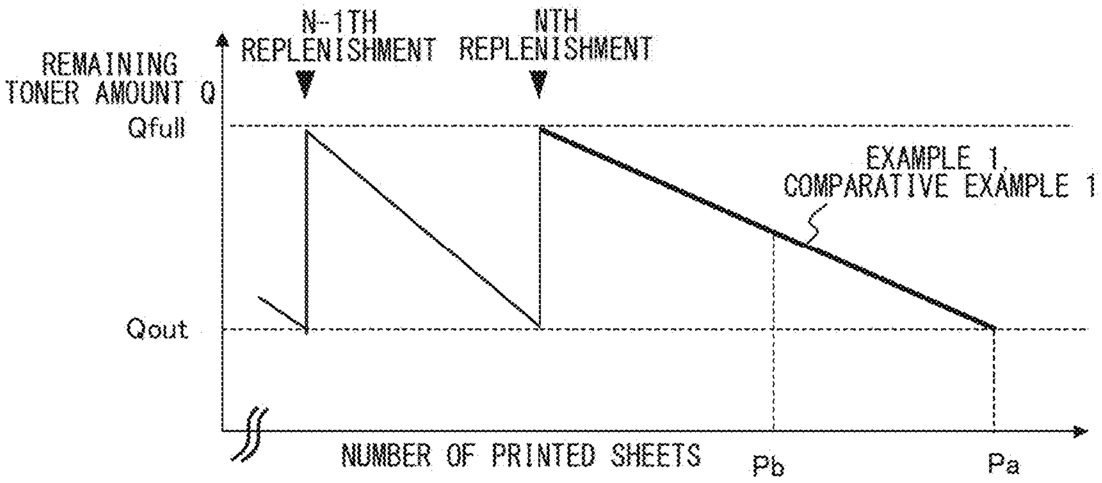
FIG. 9A is a graph showing an example of a transition in remaining toner amount in the first embodiment.
Figure 9B:
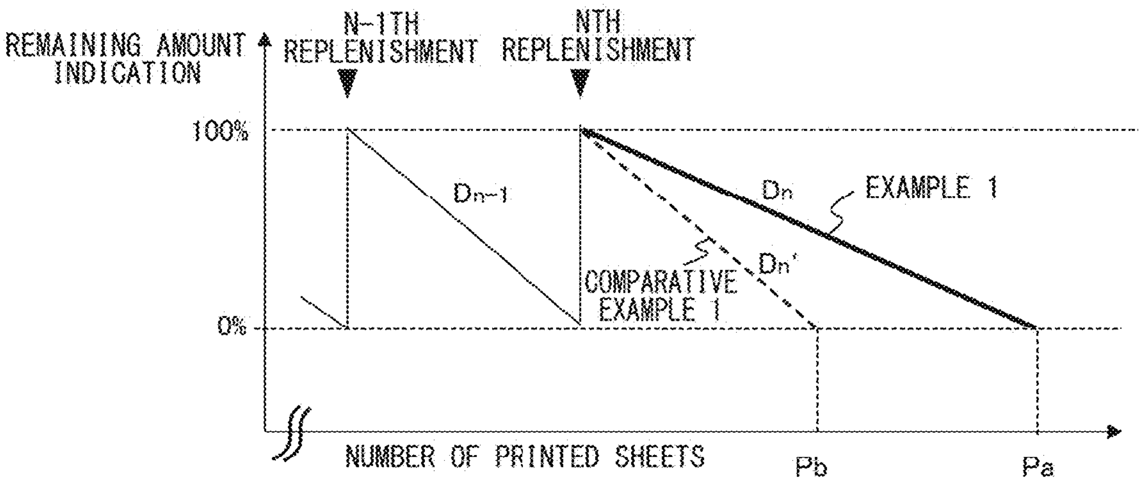
FIG. 9B is a graph showing an example of a transition in remaining toner amount indication in the first embodiment.

With reference to FIGS. 9A and 9B, a relationship between a remaining toner amount in the developing container 8 and a remaining toner amount indication when a predetermined image is repeatedly printed by the image forming apparatus 100 according to the present embodiment will be described. In a graph of FIG. 9A, the horizontal axis represents the number of printed sheets, and the vertical axis represents a remaining toner amount Q(g) in the developing container 8. A test image was repeatedly printed based on test image data in which halftone and text were mixed at an image coverage of 4%. It is assumed that the dot count value in each image forming operation is constant. In FIG. 9A, Qfull represents a value of remaining toner amount Q immediately after toner replenishment, and Qout represents a predetermined threshold of remaining toner amount Q at which toner replenishment to the developing container 8 needs to be executed. For example, in a case where the remaining toner amount is displayed by a continuous gauge as illustrated in FIG. 8, "100%" is displayed when Q=Qfull, and "0%" is displayed when Q=Qout. As described above, the remaining toner amount indication may be a stepwise indication as illustrated in FIGS. 7A to 7C.

A dot count value per test image is defined as C, a toner consumption amount when one test image is printed is defined as T(g), and a coefficient used in calculating the toner consumption amount T is defined as k. The control unit 90 of the present embodiment calculates T according to the following Formula (2).

$$T = k \cdot C \tag{2}$$

The above Formula (2) is an example of a function (T=f(C)) representing the toner consumption amount T with the dot count value C as a variable. The function f(C) may be different from Formula (2).

The control unit 90 subtracts the toner consumption amount T from the value of the remaining toner amount Q every time one test image is printed from the state of Q-Qfull. When the remaining toner amount Q becomes equal to or smaller than Qout, the control unit 90 causes the remaining amount display unit 400 to display 0%, and notifies the user to urge toner replenishment without accepting any more image forming operation. Hereinafter, a time point at which the remaining toner amount Q becomes Qout is referred to as "immediately before toner replenishment", and a time point at which toner is replenished from a state immediately before toner replenishment and the remaining toner amount Q becomes Qfull is referred to as "immediately after toner replenishment".

Here, in the present embodiment, as a measure against a change in toner consumption pace due to toner replenishment, the value of the coefficient k is changed when toner is supplied. The change in toner consumption pace means that the toner consumption amount T is different when an image is formed based on the same image data immediately before toner replenishment and immediately after toner replenishment (that is, in a case where the dot count value C for one image is the same).

The reason why the toner consumption pace changes due to toner replenishment can be described as follows. In the toner of the present embodiment, in an unused state (fresh state), there are many charging sites on the surface of the toner, and the toner has high charging performance. The charging site is mainly formed by an additive (external additive) such as silica added to the toner.

On the other hand, toner in the developing container 8 immediately before toner replenishment is in a state where it is repeatedly used for the image forming operation until the remaining toner amount Q decreases from Qfull to Qout. During image formation, the toner in the developing container 8 is borne on the developing roller 4 and rubbed against the developing blade 6, the photosensitive drum 1, and the supply roller 5. In addition, toner particles of the toner in the developing container 8 are rubbed against each other as the agitating member 7 is rotating. For this reason, in the toner in the developing container 8 immediately before toner replenishment, a ratio of toner particles in a state where charging performance is deteriorated due to the additive being embedded in the toner surface or being transferred from the toner surface to another member is high.

When a newly replenished toner having high charging performance (referred to as fresh toner) is mixed with the toner having a high ratio of toner particles in a state where charging performance is deteriorated (referred to as deteriorated toner), charge transfer occurs between the fresh toner and the deteriorated toner due to a difference in charging performance. Therefore, the charge amount of the fresh toner tends to be larger than that in a case where the fresh toner is not mixed with the deteriorated toner, and the charge amount of the deteriorated toner tends to be smaller than that in a case where the deteriorated toner is not mixed with the fresh toner. In addition, the fresh toner has higher fluidity than the deteriorated toner, and is more easily borne by the developing roller 4 than the deteriorated toner. As a result, an average charge amount of toner borne on the developing roller 4 in a state immediately after toner replenishment is larger than an average charge amount of toner borne on the developing roller 4 in a state immediately before the toner replenishment. In other words, an absolute value of the average charge amount of the toner borne on the developing member after the toner replenishment is performed is larger than an absolute value of the average charge amount of the toner borne on the developing member before the toner replenishment is performed.

Since the charge amount of toner on the developing roller 4 is larger after toner replenishment than before toner replenishment, the amount of toner required to fill a potential (post-exposure potential) of an electrostatic latent image on the photosensitive drum 1 is smaller in a state after toner replenishment than before toner replenishment. As a result, even if images are formed based on the same image data before and after toner replenishment, the toner consumption amount T per image after toner replenishment is smaller than the toner consumption amount T per image before toner replenishment.

Therefore, in the present embodiment, when the toner replenishment is performed, the value of the coefficient k for calculating the toner consumption amount T based on the dot count value C is changed to a value smaller than that before the toner replenishment.

That is, a value $k_1$ of the coefficient k after first toner replenishment and before second toner replenishment is smaller than a value $k_0$ of the coefficient k before the first toner replenishment ($k_1<k_0$). Similarly, with respect to the time point when the image forming apparatus is installed, a value of the coefficient k after Nth toner replenishment and before (N+1)th toner replenishment is defined as $k_n$, and a value of the coefficient k after (N−1)th toner replenishment and before the Nth toner replenishment is defined as $k_{n-1}$. In this case, $k_n<k_{n-1}$. That is, in the present embodiment, the value of the coefficient k decreases every time toner replenishment is performed. In the present embodiment, the value of the coefficient k is set such that, for example, a ratio $k_n/k_{n-1}$ of values of the coefficient k between before and after toner replenishment falls within a range of 0.5 to 0.95.

In other words, in a case where the image forming operation is repeatedly executed based on the same image data (the dot count value C is constant), the control unit 90 changes the value of the coefficient k when toner replenishment is performed such that a result of calculating a toner consumption amount consumed in an image forming operation after the toner replenishment is performed is smaller than a result of calculating a toner consumption amount consumed in an image forming operation before the toner replenishment is performed.

FIG. 9B is a graph showing an example of a change in remaining toner amount indication in the first embodiment. FIG. 9B illustrates a relationship between the number of printed sheets and the remaining toner amount indication when the same test image as in FIG. 9A is repeatedly printed.

As described above, in the first embodiment, the value of the coefficient k decreases when toner replenishment is performed. As a result, a value calculated as a toner consumption amount T per test image after the Nth toner replenishment is performed is smaller than a value calculated as a toner consumption amount T per test image before the Nth toner replenishment is performed. That is, in FIG. 9B, an inclination $D_n$ of the graph after the Nth toner replenishment is performed is gentler than an inclination $D_{n-1}$ of the graph before the Nth toner replenishment is performed.

Therefore, the value of the toner consumption amount T calculated based on the dot count value C can be made close to the actual toner consumption amount. In addition, the remaining toner amount (FIG. 9B) calculated based on the toner consumption amount T calculated based on the dot count value C can be made close to the actual remaining toner amount Q (FIG. 9A). In addition, the timing at which the actual remaining toner amount Q decreases to Qout is close to the timing at which the calculated remaining toner amount decreases to Qout (the timing at which the remaining toner amount indication becomes 0%). Therefore, it is possible to notify the user of toner replenishment at a more appropriate timing.

Figure 9C:
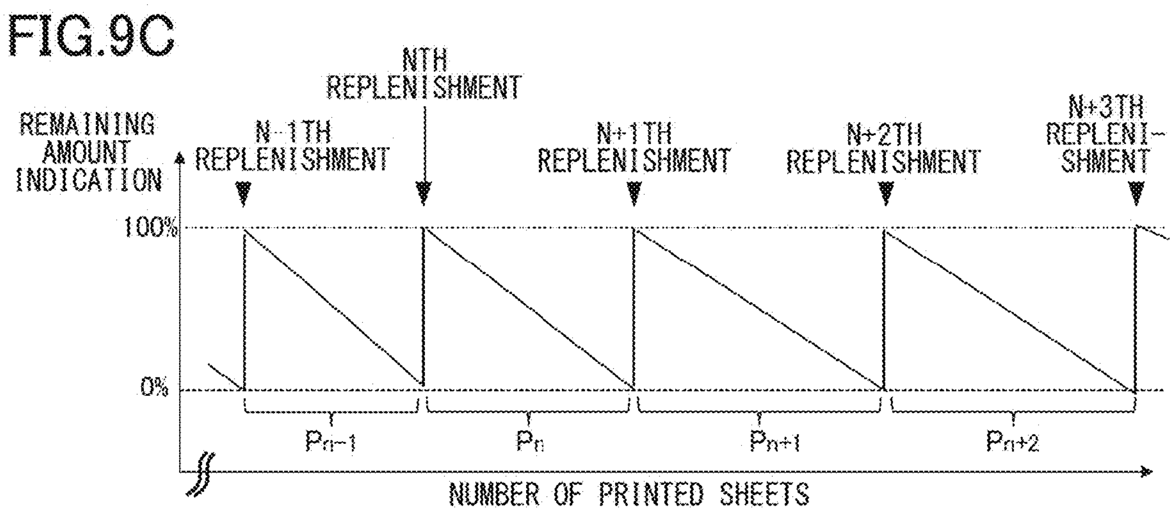
FIG. 9C is a graph showing an example of a transition in remaining toner amount indication in the first embodiment.

In the present embodiment, the value of the coefficient k decreases every time toner replenishment is performed. Therefore, in FIG. 9B, in a case where the printing of the test image is continued during the (N+1)th and subsequent toner replenishment, the relationship between the number of printed sheets and the remaining toner amount indication is as illustrated in FIG. 9C. That is, every time toner replenishment is performed, a value calculated as a toner consumption amount T per test image becomes smaller, and the inclination of the graph becomes gentler. When the number of printed sheets from the Nth toner replenishment to the (N+1)th toner replenishment is defined as $P_n$, $\ldots<P_{n-1}<P_n<P_{n+1}<P_{n+2}<\ldots$ is satisfied. That is, when the image forming operation is repeatedly executed based on the same image data, as the number of times of toner replenishment increases, the number of printed sheets from the previous toner replenishment to the next toner replenishment increases (the interval of toner replenishment increases).

Comparative Example 1

As Comparative Example 1, it is assumed that a toner consumption amount T and a remaining toner amount Q are calculated without changing the value of the coefficient k even when toner replenishment is performed. Except that the value of the coefficient k after the Nth toner replenishment is the same as that before the toner replenishment, the configuration of the apparatus and the methods of calculating the toner consumption amount T and the remaining toner amount Q are the same as those in the first embodiment. Therefore, as illustrated in FIG. 9A, the transition in actual remaining toner amount Q when the above-described test image is repeatedly output coincides with that in the first embodiment.

On the other hand, the toner consumption amount T per test image calculated based on the dot count value C in Comparative Example 1 does not change between before and after the Nth toner replenishment. Therefore, as indicated by a broken line in FIG. 9B, an inclination $D_n'$ of the graph after the Nth toner replenishment is the same as the inclination $D_{n-1}$ of the graph before the Nth toner replenishment, and is relatively steeper than the inclination $D_n$ of the graph after the Nth toner replenishment in the first embodiment.

As a result, the number of printed sheets Pb at which the remaining toner amount Q calculated in Comparative Example 1 is 0% is smaller than the number of printed sheets Pa at which the remaining toner amount Q calculated in the first embodiment is 0%. That is, in Comparative Example 1, the toner replenishment notification is performed even though the toner larger than Qout actually remains in the developing container 8 at the time point of the number of printed sheets Pb. In contrast, according to the present embodiment, the toner replenishment notification can be executed at the time point of the number of printed sheets Pa when the actual remaining toner amount Q in the developing container 8 is equal to or smaller than Qout or at a timing close thereto.

Control Method

Figure 10:
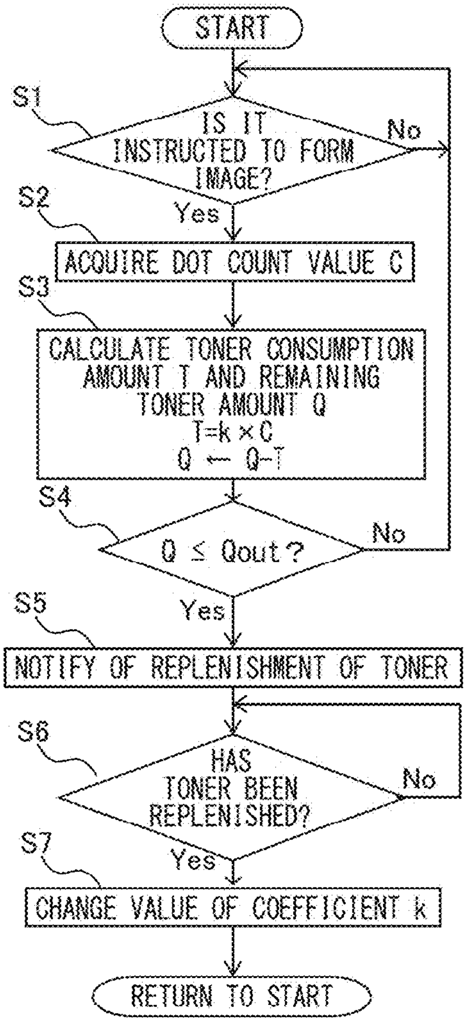
FIG. 10 is a flowchart illustrating a control method according to the first embodiment.

FIG. 10 is a flowchart illustrating an example of a control method according to the present embodiment. Each step of this flow is realized by the CPU 91 of the control unit 90 reading a program from the ROM 93 and executing the program. In addition, this flow is continuously processed during a period in which the main power supply of the image forming apparatus 100 is turned on.

Every time an image forming operation is executed (S1Yes), the control unit 90 acquires a dot count value C of an image formed in the image forming operation (S2). The control unit 90 calculates a toner consumption amount T for forming the image based on the acquired dot count value C, and calculates a remaining toner amount Q in the developing container 8 after executing the image forming operation (S3). Specifically, the toner consumption amount T calculated in the present embodiment is a value obtained by multiplying the dot count value C by the coefficient k, and the remaining toner amount Q after the image forming operation is executed is a value obtained by subtracting the toner consumption amount T from the remaining toner amount Q before the image forming operation is executed.

In a case where the remaining toner amount Q after the execution of the image forming operation is equal to or smaller than the preset threshold (equal to or smaller than Qout) (S4Yes), the control unit 90 executes the toner replenishment notification without accepting a new image forming operation, and prompts the user to replenish toner (S5). Thereafter, when it is detected that toner replenishment has been performed (S6Yes), the control unit 90 changes the value of the coefficient k (S7), returns to the start, and waits for a next image forming instruction. In the present embodiment, when the control unit 90 detects that the toner pack 40 is attached to the attachment portion 57 and then removed based on a detection signal of the attachment sensor 53, it is determined that toner has been replenished. On the other hand, when the remaining toner amount Q after the image forming operation is executed is larger than the threshold (Qout) (S4No), a next image forming instruction is waited for without performing a toner replenishment notification and changing the value of the coefficient k.

The value of the coefficient k after the Nth toner replenishment is performed is defined as $k_n$ (n=1, 2, 3, . . . ). In the present embodiment, the value of each $k_n$ is considered in advance according to, for example, a specific toner production method and a specific configuration of the developing unit 20, and is stored in the ROM 93 (FIG. 6) as a preset value. The CPU 91 counts up the number of times of toner replenishment every time toner replenishment is performed, reads a value of $k_n$ corresponding to the number of times of toner replenishment up to now from the ROM 93 to use the read value in calculating a toner consumption amount T in the next and subsequent image forming operations.

The value of the coefficient k may be calculated as needed according to the mode of toner consumption in a period from one toner replenishment to the next toner replenishment. The mode of toner consumption is, for example, a relationship between an average image coverage (an average value of image coverages of images output from previous toner replenishment up to now) and the degree of deterioration of toner. For example, when the average image coverage is high, since the toner is consumed earlier than the deterioration of the toner, the toner replenishment notification is performed earlier in a state where the deterioration of the toner is not progressed much. In such a case, the value of the coefficient k may not be changed at the time of toner replenishment, or the change width may be smaller than that in a case where the average image coverage is low.

SUMMARY OF PRESENT EMBODIMENT

As described above, in the present embodiment, the value of the coefficient k used in calculating the toner consumption amount T based on the dot count value C is changed when the toner replenishment is performed. As a result, even when the actual toner consumption amount changes in a case where an image based on the same image data is formed between before and after toner replenishment, the calculated toner consumption amount T can be close to the actual toner consumption amount.

That is, according to the present embodiment, the toner consumption amount calculation accuracy can be improved.

In the present embodiment, as described above, a toner replenishment type (external replenishment type) is used in which toner is replenished from the toner pack 40 (replenishing container) outside the image forming apparatus 100 to the developing container 8 (toner storage portion) inside the apparatus. In the toner replenishment type, it is important to correctly grasp a remaining toner amount Q in the developing container 8, reflect the remaining toner amount Q in the display on the remaining amount display unit 400, and notify the user to prompt toner replenishment at an appropriate timing. In a case where the accuracy in calculating the remaining toner amount Q is low, for example, if a toner replenishment notification is performed even though the actual remaining toner amount Q is large and the user replenishes toner, there is a possibility that all of the toner in the toner pack 40 cannot be replenished into the developing container 8 and some of the toner is wasted. In addition, in a case where a toner replenishment notification is not performed although the actual remaining toner amount Q is smaller than Qout, there is a possibility that an image defect occurs or the developing roller 4 is damaged due to depletion of the toner in the developing container 8.

Further, in the present embodiment, a cleanerless configuration is used in which transfer residual toner which has not been transferred to the recording material P (transfer object) in the transfer portion N1 is collected in the developing container 8 by the developing roller 4. In the cleanerless configuration, since some of the toner developed on the photosensitive drum 1 is collected in the developing container 8 via the transfer portion N1, the charging portion N2, and the like, and is repeatedly used for image formation, the ratio of deteriorated toner in a state where charging performance is deteriorated tends to be high. As a result, the mixture of fresh toner and deteriorated toner may easily cause an increase in average charge amount of toner on the developing roller 4 and an accompanying change in toner consumption amount per image. Therefore, the present technology of changing the value of the coefficient k used in calculating the toner consumption amount T between before and after toner replenishment may be particularly advantageous in the cleanerless configuration.

However, even in a configuration including a cleaning member that removes transfer residual toner between the transfer portion N1 and the charging portion N2, the toner itself deteriorates because the toner is rubbed against the agitating member 7 or the developing blade 6 in the developing container 8. Therefore, in an image forming apparatus not having the cleanerless configuration, the value of the coefficient k may be changed when toner is replenished as in the present embodiment.

Modification where Value of Coefficient k Increases

In the first embodiment, it has been described that, when toner replenishment results in a mixture of fresh toner and deteriorated toner, the average charge amount of toner on the developing roller 4 is larger than that before the toner replenishment, and the toner consumption amount per test image is smaller than that before the toner replenishment. However, toner replenishment may decrease the average charge amount of toner on the developing roller 4 as compared with that before the toner replenishment, and as a result, the toner consumption amount per test image may increase as compared with that before the toner replenishment.

For example, when the charging performance of the base material (base resin) of the toner particles is very strong and it is difficult to control developability and transferability, an additive that suppresses the charging performance of the toner may be added. Specifically, the charge amount may be suppressed by releasing the charge from the base material of the toner particles with an additive having a low electric resistance, or reducing the area of contact with the toner or each member with an additive having a slightly high electric resistance. In this case, the toner immediately before toner replenishment is in a state in which the charging performance is improved as compared with that of fresh toner because the additive is embedded in the toner surface or transferred from the toner surface to another member due to repeated use in image formation. On the other hand, the fresh toner supplied by the toner replenishment tends to be preferentially borne on the developing roller 4 because the charging performance is suppressed by the additive and the fluidity is high. As a result, in a state immediately after the toner replenishment, the average charge amount of the toner on the developing roller 4 becomes smaller than that immediately before the toner replenishment.

In such a case, when toner is replenished into the developing container 8, the control unit 90 changes the value of the coefficient k so that the value of the coefficient k after the toner replenishment is larger than the value of the coefficient k before the toner replenishment. That is, a value of the coefficient k after Nth toner replenishment and before (N+1) th toner replenishment is defined as $k_n$, and a value of the coefficient k after (N−1)th toner replenishment and before the Nth toner replenishment is defined as $k_{n-1}$. In this case, in the present modification, the value of the coefficient k is changed so that $k_n > k_{n-1}$. As a result, in the present modification as well, the toner consumption amount calculation accuracy can be improved.

In the present modification, when the test image is repeatedly printed based on the same image data, the interval of toner replenishment ($P_{n-1}$, $P_n$, $P_{n+1}$, . . . in FIG. 9C) has a relationship in which $\ldots > P_{n-1} > P_n > P_{n+1} > P_{n+2} > \ldots$ is satisfied.

The value of the coefficient k after toner replenishment as compared with the value before toner replenishment may be appropriately adjusted by a designer of the image forming apparatus 100 after understanding the characteristics of the toner and the apparatus.

Modification Regarding Detection of Toner Replenishment

The attachment sensor 53 of the present embodiment is merely an example of a detection unit for detecting toner replenishment from the toner pack 40 (replenishing container). For example, when the toner replenishment is completed, the user may operate the operation unit 300 to input the completion of the toner replenishment, and the control unit 90 may detect the toner replenishment based on the information from the operation unit 300. At the completion of the toner replenishment, the user may operate an external computer communicably connected to the image forming apparatus 100 to input the completion of the toner replenishment, so that the control unit 90 detects the toner replenishment. A reception unit (external interface) that receives a signal from an external computer in the operation unit 300 or the control unit 90 in this case is an example of a detection unit that detects toner replenishment. In a case where a tag (storage medium) is attached to the toner pack 40 and the toner pack 40 is attached to the attachment portion 57, the control unit 90 may detect toner replenishment by reading information from the tag.

Second Embodiment

As a second embodiment, changing the charging voltage and/or the developing voltage when toner replenishment is performed will be described. Hereinafter, unless otherwise specified, elements denoted by the same reference signs as those in the first embodiment have basically the same configurations and operations as those described in the first embodiment, and differences from the first embodiment will be mainly described.

The reason for changing the charging voltage and/or the developing voltage when toner replenishment is performed is to improve a fogging image. The fogging image is an image defect in which toner adheres thinly to a surface region (non-exposed region) on the photosensitive drum 1 where a toner image should not be originally developed, resulting in a thin image being formed in a region (white portion) of the recording material P where an image should not be originally formed. The toner adhering to the non-exposed region of the surface region on the photosensitive drum 1 having passed through the developing portion 21 is referred to as fogging toner.

One of the causes of the fogging image is soiling of the charging roller 2 that deteriorates the charging performance, making the pre-exposure potential VD, which is a surface potential of the photosensitive drum 1 after the charging step, lower (the absolute value becomes smaller) than the design value (−800 V in the present embodiment). When the pre-exposure potential VD decreases, a sufficient potential difference is not formed between the non-exposed region of the photosensitive drum 1 and the developing roller 4 in the developing portion 21, and some of the toner on the developing roller 4 moves to the non-exposed region of the photosensitive drum 1 and becomes fogging toner.

One of the causes of the soiling of the charging roller 2 is deterioration of the toner that increases the number of toner particles entering the charging portion N2 (the nip portion between the charging roller 2 and the photosensitive drum 1). That is, during repeated use for image formation, the adhesion of the toner to the photosensitive drum 1 may increase, because the toner additive is embedded in the surface of the toner or the toner particles are deformed as being rubbed against the developing blade 6 or the like. When the adhesion of the toner to the photosensitive drum 1 increases, the transfer residual toner is more likely to occur, and the amount of the transfer residual toner that reaches the charging portion N2 increases. In addition, the increase in the adhesion of the toner to the photosensitive drum 1 itself becomes a factor that causes fogging toner to easily occur.

In a state where the fogging toner and the transfer residual toner are small, even if the toner adheres to the charging roller 2, the toner is charged to a negative polarity by frictional charging caused when the photosensitive drum 1 and the charging roller 2 are rubbed against each other in the charging portion N2, and is gradually returned to the photosensitive drum 1. When the fogging toner and the transfer residual toner increase, the pace at which the toner adheres to the charging roller 2 increases, and the toner adhering to the charging roller 2 may not be sufficiently removed by the above-described mechanism, causing gradual accumulation of soiling.

Therefore, when the ratio of fresh toner that does not deteriorate on the developing roller 4 increases by replenishing toner, the occurrence of fogging toner and transfer residual toner decreases, and the soiling of the charging roller 2 can be improved.

In the present embodiment, it is proposed that the fogging toner is further reduced and the fogging image is further improved by increasing the charging voltage when toner replenishment is performed. The increase of the charging voltage means increasing the absolute value of the DC component of the charging voltage. When the charging voltage is increased, the surface potential (pre-exposure potential VD) of the photosensitive drum 1 after the charging step is increased. As a result, in the developing portion 21, the potential difference Vback between the surface potential (pre-exposure potential VD) in the non-exposed region of the photosensitive drum 1 and the potential (the DC component of the developing voltage) of the developing roller 4 increases. The potential difference Vback acts to prevent the toner charged to the normal polarity from moving from the developing roller 4 to the non-exposed region of the photosensitive drum 1, and thus may be referred to as a fogging prevention contrast.

Figure 11:
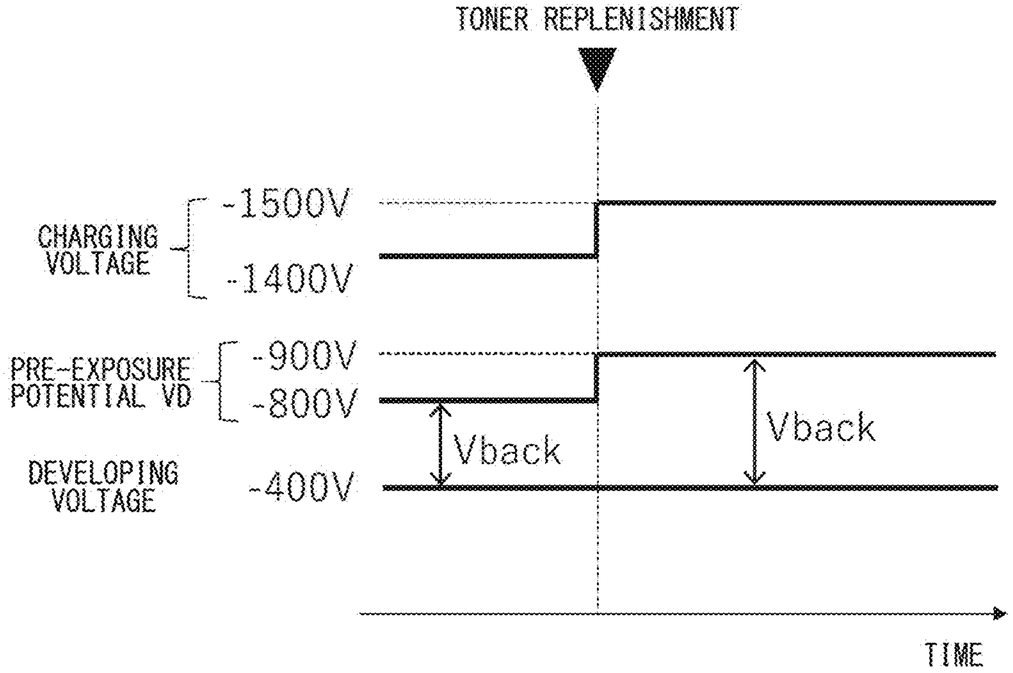
FIG. 11 is a view illustrating an example in which a charging voltage and a developing voltage are controlled according to a second embodiment.

FIG. 11 illustrates an example in which the charging voltage and the developing voltage are controlled according to the present embodiment. The control unit 90 of the present embodiment changes the charging voltage from −1400 V to −1500 V at a timing when toner replenishment is performed. As a result, the pre-exposure potential VD of the portion not affected by the soiling of the charging roller 2 on the photosensitive drum 1 changes from −800 V to about −900 V, and the pre-exposure potential VD of the portion affected by the soiling of the charging roller 2 is higher (the absolute value is larger) than that before the change of the charging voltage. On the other hand, in the illustrated example, the developing voltage is constant at −400 V between before and after toner replenishment. In this case, in the portion not affected by the soiling of the charging roller 2 on the photosensitive drum 1, the potential difference Vback before the toner replenishment is −400 V, whereas the potential difference Vback after the toner replenishment is −500 V. In addition, the absolute value of the potential difference Vback after the toner replenishment is larger than the absolute value of the potential difference Vback before the toner replenishment in the portion affected by the soiling of the charging roller 2 on the photosensitive drum 1. In this manner, by increasing the absolute value of the potential difference Vback, it is possible to secure a sufficient pre-exposure potential VD and potential difference Vback even in a case where there is a portion where the charging performance is deteriorated due to the soiling of the charging roller 2, and thus, it is possible to further reduce the fogging toner and improve the fogging image.

Although FIG. 11 illustrates an example in which the charging voltage is increased when toner replenishment is performed, the developing voltage may be decreased (the absolute value may be decreased) when toner replenishment is performed. In addition, the charging voltage may be increased and the developing voltage may be decreased. In either case, the potential difference Vback after toner replenishment is increased as compared with that before toner replenishment, and thus advantages similar to those of the present embodiment can be obtained.

In this manner, the control unit 90 changes at least one of the charging voltage (first voltage) and the developing voltage (second voltage) when toner replenishment is performed. In particular, the surface potential (pre-exposure potential VD) of the photosensitive drum 1 after being charged by the charging roller 2 to which the charging voltage (first voltage) is applied is defined as a first potential, and the potential of the developing roller 4 to which the developing voltage (second voltage) is applied is defined as a developing potential (second potential). In this case, when toner replenishment is performed, the control unit 90 of the present embodiment changes at least one of the charging voltage (first voltage) and the developing voltage (second voltage) so that the potential difference Vback between the pre-exposure potential VD (first potential) and the developing potential (second potential) increases.

The charging voltage and/or the developing voltage may be changed every time toner replenishment is performed once, or may be changed when toner replenishment is performed a predetermined number of times from the time when the image forming apparatus 100 is installed. In addition, the trigger for changing the charging voltage and/or the developing voltage may be, for example, a detection signal of the attachment sensor 53 as in the first embodiment. The trigger may be operating the operation unit 300 or an external computer for inputting completion of toner replenishment, or reading information from the tag of the toner pack 40.

In the present embodiment, the potential difference Vback increases between before and after toner replenishment. When the potential difference Vback increases, the toner consumption amount decreases especially at the edges of lines or text and in halftone regions in the image. The reason therefor can be explained as follows.

In the development step, a toner image is developed with toner adhering to a region on the side (the side close to 0 V) where the potential is lower than the developing potential (the DC component of the developing voltage) on the surface of the photosensitive drum 1. On the other hand, the potential distribution of the latent image formed in the exposure step does not rise perpendicularly from the pre-exposure potential VD to the post-exposure potential VL, but rises with a certain degree of inclination. Therefore, when the potential difference Vback increases, the region on the side where the potential is lower than the developing potential becomes narrow, and the toner adhering to the surface of the photosensitive drum 1 decreases. Since the above-described mechanism occurs at edges of latent images, the above-described mechanism is more likely to occur in images with edge (images containing line diagrams composed of lines or text) than in solid images with no edges, and is more remarkable particularly in halftone regions where the edge density is high.

As described above, in the present embodiment, since the potential difference Vback increases in addition to the change in average charge amount of toner borne on the developing roller 4 between before and after toner replenishment, the toner consumption pace after the toner replenishment further decreases as compared with that in the first embodiment. However, in the present embodiment, it is possible to appropriately cope with the change in toner consumption pace by decreasing the value of the coefficient k in consideration of the influence of the increase in potential difference Vback when the toner replenishment is performed.

Therefore, according to the present embodiment, the accuracy in calculating the toner consumption amount T based on the dot count value C can be enhanced. In addition, similarly to FIGS. 9A and 9B of the first embodiment, the relationship between the actual remaining toner amount and the remaining toner amount indication can be correctly maintained.

Figure 12:
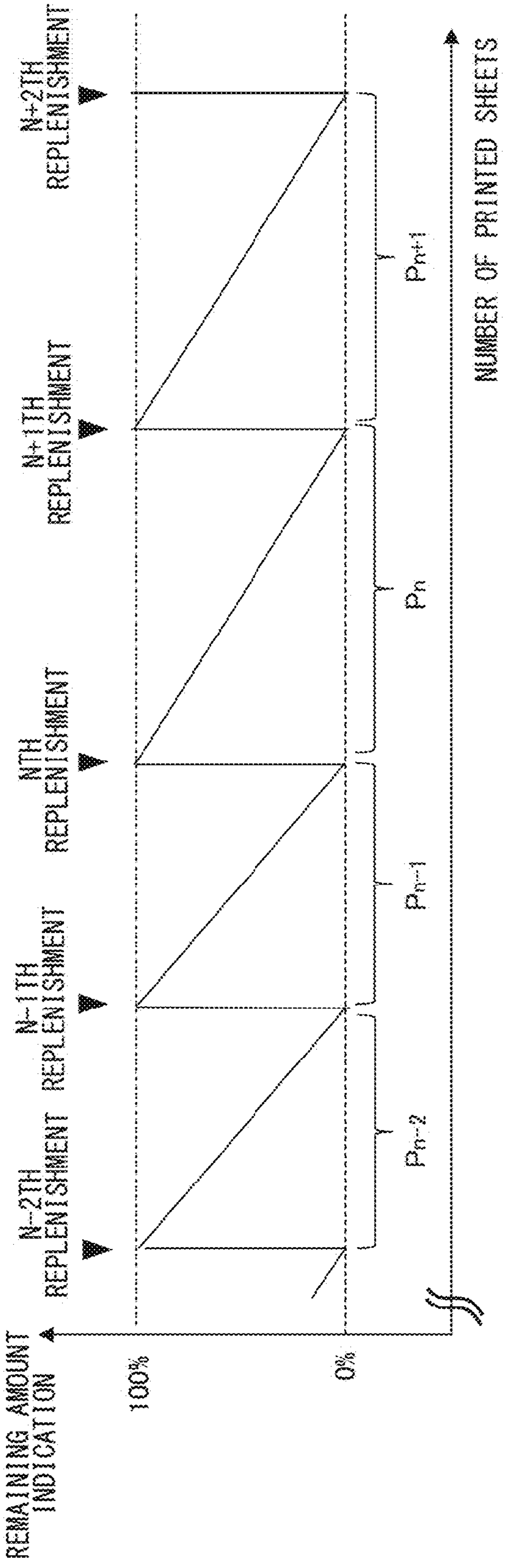
FIG. 12 is a graph showing an example of a transition in remaining toner amount indication in the second embodiment.

In a case where toner replenishment is repeated while a test image based on the same image data is repeatedly printed by the image forming apparatus 100 of the present embodiment, for example, a behavior as illustrated in FIG. 12 is shown. In this example, when Nth toner replenishment is performed, the charging voltage is changed to increase the potential difference Vback, and the value of the coefficient k is decreased. When (N−1)th toner replenishment and (N+1)th toner replenishment are performed, the values of the charging voltage and the coefficient k are not changed.

In this case, the actual toner consumption amount per test image after the Nth toner replenishment is smaller than that before the Nth toner replenishment due to the influence of the change in average charge amount of the toner and the increase of the potential difference Vback. On the other hand, the value of the coefficient k after the Nth toner replenishment is changed to a value smaller than that before the Nth toner replenishment. Therefore, after the Nth toner replenishment is performed, the toner consumption amount per test image calculated based on the dot count value C decreases, and the inclination of the graph becomes gentle. When the number of printed sheets from the Nth toner replenishment to the (N+1)th toner replenishment is defined as $P_n$, $P_{n-2}=P_{n-2}<P_n=P_{n+1}$ is satisfied.

Note that, in the present embodiment, an example has been described in which the charging voltage and/or the developing voltage is changed so that the potential difference Vback when the toner replenishment is performed increases as compared with that before the toner replenishment is performed. Not limited thereto, the charging voltage and/or the developing voltage may be changed so that the potential difference Vback decreases as compared with that before the toner replenishment is performed. In this case, the value of the coefficient k after toner replenishment may be changed to a value larger than that before toner replenishment. As a case where the potential difference Vback decreases, for example, as in the first embodiment, there is a case where it is desired to prevent an overall decrease in image density caused by toner replenishment, which increases the average charge amount of toner on the developing roller 4, resulting in images of thin lines or small dots becoming thinner or lighter.

First Modification

Immediately after the toner replenishment, the mechanism described in the first embodiment increases the average charge amount of the toner on the developing roller 4, and decreases the toner consumption pace. However, as the number of printed sheets increases thereafter, the difference in properties between the toner replenished by the immediately preceding toner replenishment and the old toner existing in the developing container 8 before the immediately preceding toner replenishment is alleviated. As a result, the toner consumption pace may return to the same extent as that before the immediately preceding toner replenishment.

The present modification proposes a configuration capable of coping with a situation in which the toner consumption pace increases at a stage where the number of printed sheets after toner replenishment increases to some extent as compared with that immediately after toner replenishment.

Figure 13A:
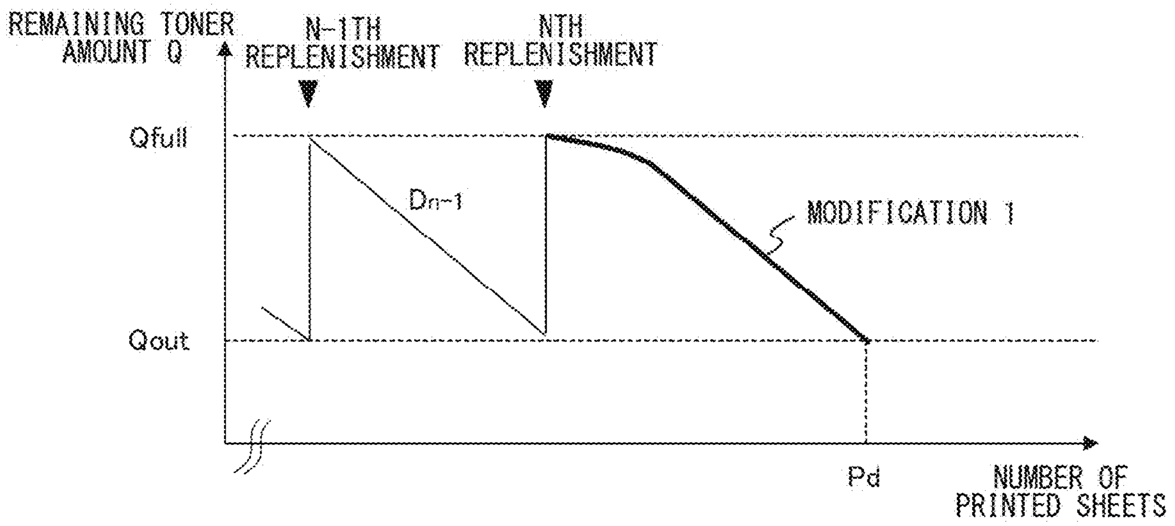
FIG. 13A is a graph showing an example of a transition in remaining toner amount in a first modification.

FIG. 13A is a graph showing a transition in remaining toner amount Q in the developing container 8 in the present modification. When toner replenishment is repeatedly performed while a test image based on the same image data is repeatedly printed, the rate at which the remaining toner amount Q decreases is lower immediately after Nth toner replenishment than before the toner replenishment. On the other hand, for the reason described above, when the number of printed sheets increases to some extent from the Nth toner replenishment, the rate at which the remaining toner amount Q decreases increases to the same level as that before the Nth toner replenishment.

Figure 13B:
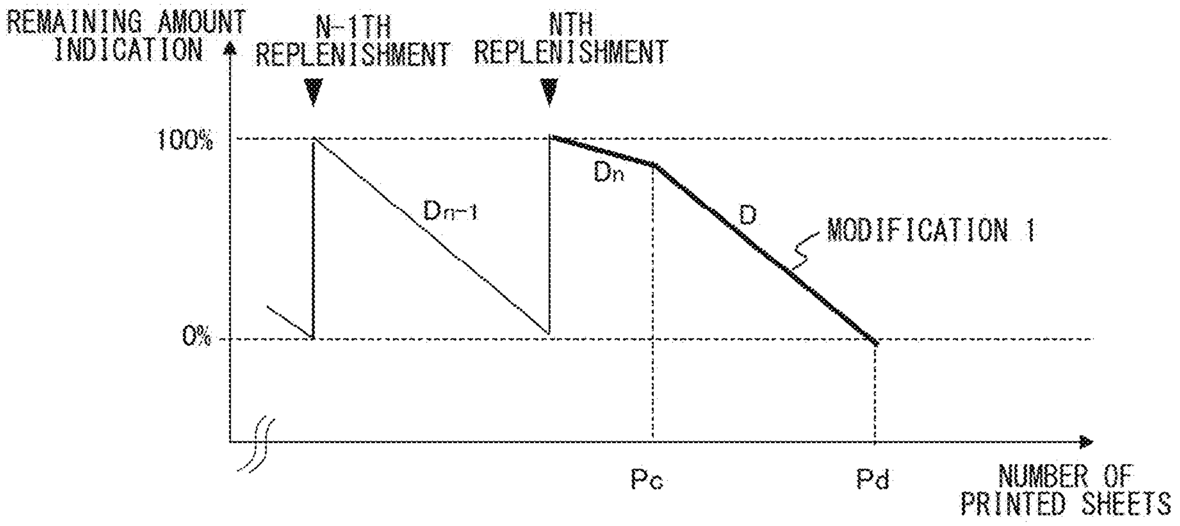
FIG. 13B is a graph showing an example of a transition in remaining toner amount indication in the first modification.

FIG. 13B is a graph showing a transition in remaining toner amount in the remaining amount display unit 400. In the present modification, the value ($k_n$) of the coefficient k similar to that in the first embodiment is used from immediately after the Nth toner replenishment until a predetermined number of images are output (until the cumulative number of printed sheets becomes Pc). However, after the predetermined number of images are output from immediately after the Nth toner replenishment, the value of the coefficient k is returned to the same value as that immediately before the Nth toner replenishment. Therefore, from immediately after the Nth toner replenishment until a predetermined number of images are output, an inclination $D_n$ of the remaining toner amount calculated based on the dot count value C is gentler than an inclination $D_{n-1}$ immediately before the Nth toner replenishment. On the other hand, after the predetermined number of images are output, an inclination $D_n''$ of the remaining toner amount calculated based on the dot count value C becomes substantially the same as the inclination $D_{n-1}$ immediately before the Nth toner replenishment.

In other words, the value of the coefficient k is changed to a second value ($k_n$) smaller than a first value ($k_{n-1}$), which is a value of the coefficient before current toner replenishment is performed, after the current toner replenishment is performed, and thereafter, the control unit 90 changes the value of the coefficient to a third value ($k_{n-1}$) larger than the second value ($k_n$) before next toner replenishment is performed. In the present embodiment, an example in which the third value is the same as the first value, that is, the value of the coefficient k is changed from $k_{n-1}$ to $k_n$ and then returned to $k_{n-1}$ has been described, but the third value may be different from the first value.

By performing the above-described control, the remaining toner amount calculated based on the dot count value C is equal to or smaller than Qout (0%) at substantially the same timing as the number of printed sheets Pd at which the actual remaining toner amount Q is equal to or smaller than Qout. Therefore, even if the toner consumption pace increases when the number of printed sheets increases to some extent after toner replenishment, a toner replenishment notification can be performed at an appropriate timing.

In the second embodiment, when the potential difference Vback increases for a certain time after toner replenishment is performed, and the potential difference Vback is returned to the original value after a period in which the soiling of the charging roller 2 is removed has elapsed, the toner consumption pace may increase. Therefore, when toner replenishment is performed in the second embodiment, control may be performed to change the charging voltage and/or the developing voltage, and then return the charging voltage and/or the developing voltage to the basic value. In other words, the control unit 90 may change at least one of the charging voltage (first voltage) and the developing voltage (second voltage) so that the potential difference Vback increases after current toner replenishment is performed, and thereafter change at least one of the charging voltage (first voltage) and the developing voltage (second voltage) so that the potential difference Vback decreases before next toner replenishment is performed. As a result, even if the toner consumption pace increases when the number of printed sheets increases to some extent after toner replenishment as compared with that immediately after the toner replenishment, a toner replenishment notification can be performed at an appropriate timing.

Second Modification

In the first embodiment, when toner replenishment increases the charge amount of toner on the developing roller 4, the toner consumption amount decreases in a halftone image, but the toner consumption amount hardly changes in a text image and a solid image. In addition, in the second embodiment, in a case where the potential difference Vback increases when toner replenishment is performed, the toner consumption amount decreases in a halftone image, but the toner consumption amount hardly changes in a text image or a solid image.

This is because, due to the characteristics of electrophotography, the halftone image is more likely to be affected by the charge amount of toner and the change in potential difference Vback than the solid image. The reason why the toner consumption amount of the halftone image decreases when the potential difference Vback increases is as explained in the second embodiment.

Figure 14A:
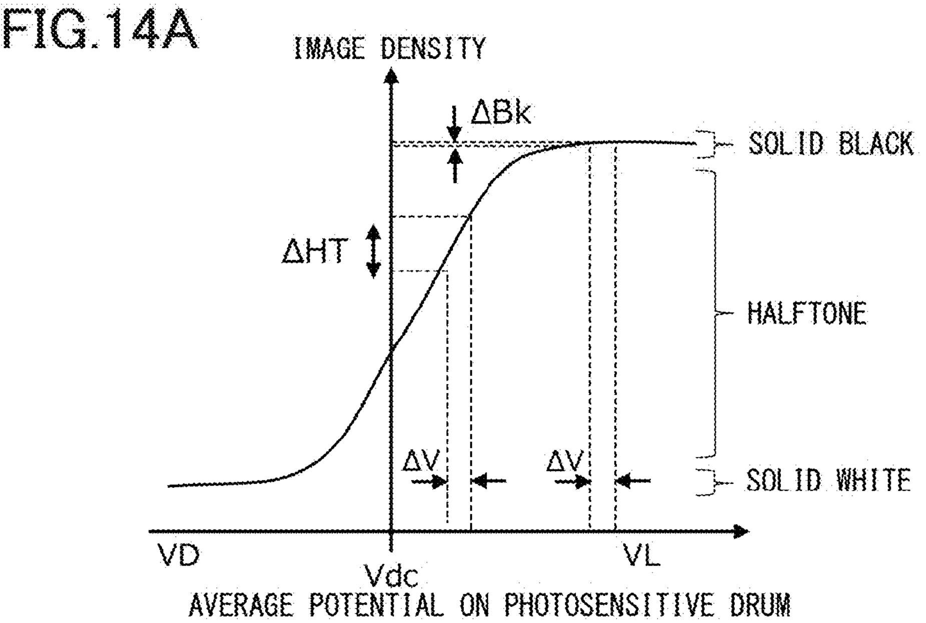
FIG. 14A is a view for explaining a fluctuation in density of a halftone image in a second modification.

The reason why the toner consumption amount of the halftone image tends to decrease as the charge amount of toner on the developing roller 4 increases can be explained as follows with reference to FIG. 14A. In FIG. 14A, the horizontal axis represents an average potential on the photosensitive drum 1, and the vertical axis represents am image density. In the horizontal axis direction, the right side indicates a post-exposure potential VL and the left side indicates a pre-exposure potential VD. The average potential on the photosensitive drum 1 is a surface potential of the photosensitive drum 1 averaged in a surface region of the photosensitive drum 1 where the image density is constant. Vdc on the horizontal axis is a potential of the developing roller 4 (a DC component of the developing voltage).

In the surface region on the photosensitive drum 1 corresponding to a halftone image, a region of post-exposure potential VL and a region of pre-exposure potential VD are finely mixed. Therefore, as illustrated in FIG. 14A, in the surface region on the photosensitive drum 1 corresponding to the halftone image, the average potential on the photosensitive drum 1 is an intermediate potential between the post-exposure potential VL and the pre-exposure potential VD. On the other hand, a region (solid black region) on the photosensitive drum 1 corresponding to a solid image is uniformly at the post-exposure potential VL, and a region (solid white region) on the photosensitive drum 1 corresponding to a white background portion is uniformly at the pre-exposure potential VD.

By increasing Vback, the average potential on the photosensitive drum 1 fluctuates. In the solid black region, even if the average potential of the photosensitive drum 1 slightly fluctuates (fluctuation range ΔV), the fluctuation range ΔBk of the image density is small. On the other hand, in the halftone region, when the average potential of the photosensitive drum 1 fluctuates with the same fluctuation range ΔV, the fluctuation range ΔHT of the image density increases. This is because, as one factor, the toner is developed in an overlapped state in multiple layers in the solid black region, whereas the toner is developed in a single layer in the halftone region and the coverage of the recording material is also low, and thus a decrease in amount of toner to be developed greatly affects the image density.

In any case, when the charge amount of toner on the developing roller 4 increases or when the potential difference Vback increases in the first embodiment or the second embodiment, the toner consumption amount may decrease in the halftone image, while the toner consumption amount may hardly change in the text image or the solid image.

In the present modification, in order to cope with such a situation, the value of the coefficient k used in calculating the toner consumption amount is changed based on the area occupied by the halftone region in the image formed by one image forming operation. In the present embodiment, the value of the coefficient k is changed such that the larger the area of the halftone region, the smaller the value of the coefficient k. The area of the halftone region can be obtained, for example, by counting pixels having a density in the range of 10% to 90% in a raster image obtained by image processing of image data.

Figure 14B:
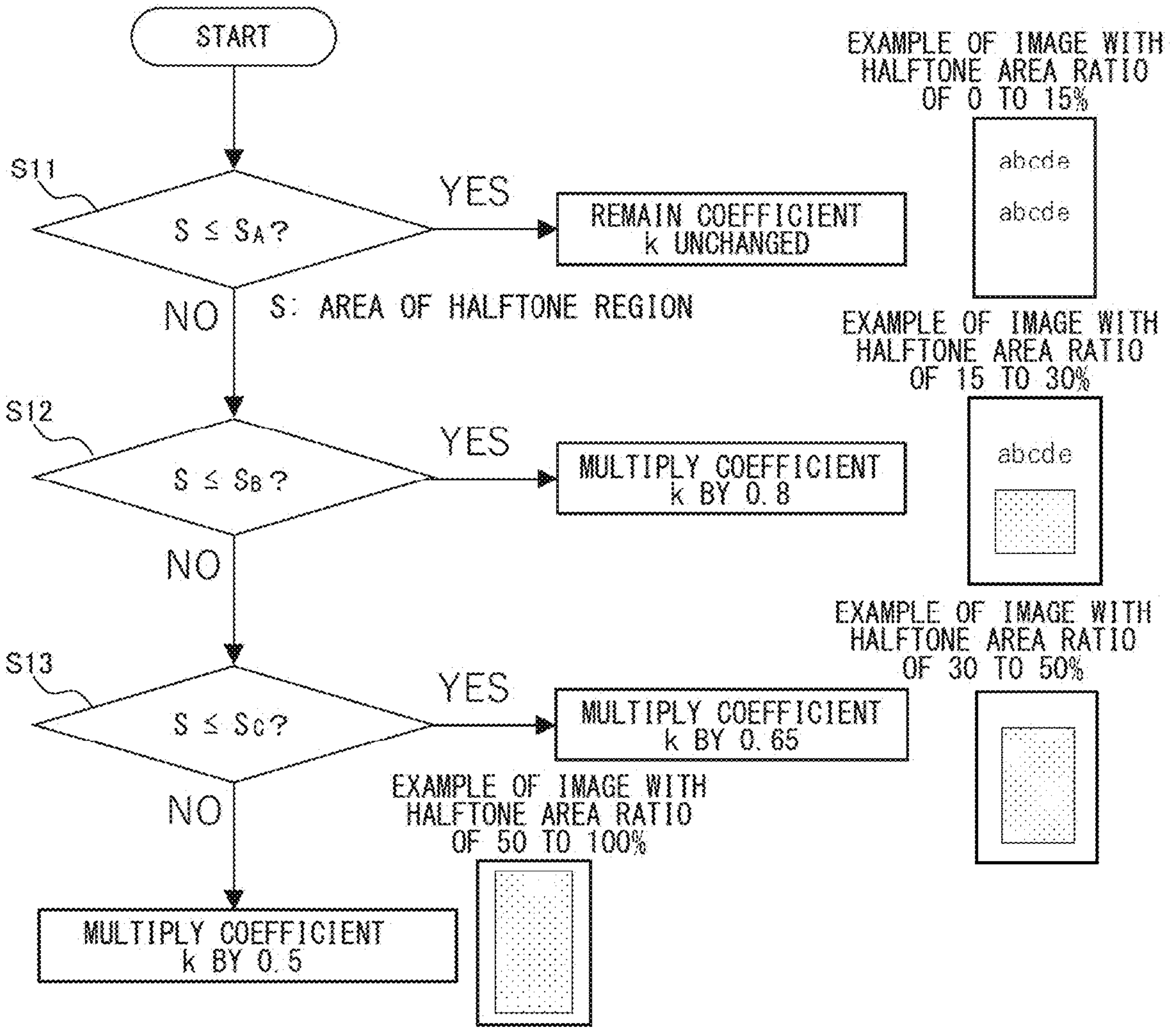
FIG. 14B is a view illustrating a flow for determining a coefficient k in the second modification.

FIG. 14B illustrates an example of a determination flow for determining the value of the coefficient k in the present modification. The area of the halftone region is defined as S, and preset thresholds are defined as $S_A$, $S_B$, and $S_C$. $S_A<S_B<S_C$, and for example, $S_A$ corresponds to an area of about 15% of an A4-size recording material P, $S_B$ corresponds to an area of about 30%, and $S_C$ corresponds to an area of about 50%.

The value of the coefficient k before the Nth toner replenishment is performed is defined as $k_{n-1}$, and the value of the coefficient k after the Nth toner replenishment is performed is defined as $k_n$. In the present modification, when the area S of the halftone region of the image to be printed is equal to or smaller than $S_A$ (S11YES), $k_n$ is set to a value equal to $k_{n-1}$. When area S is larger than $S_A$ and equal to or smaller than $S_B$ (S12YES), $k_n$ is set to 0.8 times $k_{n-1}$ ($k_n/k_{n-1}=0.8$). When area S is larger than $S_B$ and equal to or smaller than $S_C$ (S13YES), $k_n$ is set to 0.65 times $k_{n-1}$ ($k_n/k_{n-1}=0.65$). When the area S is equal to or larger than $S_c$ (S13NO), $k_n$ is set to 0.5 times $k_{n-1}$ ($k_n/k_{n-1}=0.5$).

The above-described determination flow may be performed for each image data sheet that is a target of the image forming operation. That is, in continuous printing, an area S of a halftone region in a first image may be different from an area S of a halftone region in a second image. In this case, a value $k_n$ of the coefficient k used in calculating a toner consumption amount for the first image and a value $k_n$ of the coefficient k used in calculating a toner consumption amount for the second image may be different.

FIGS. 15A to 15D illustrate examples of transitions in remaining toner amount and remaining toner amount indication in the present modification.

Figure 15A:
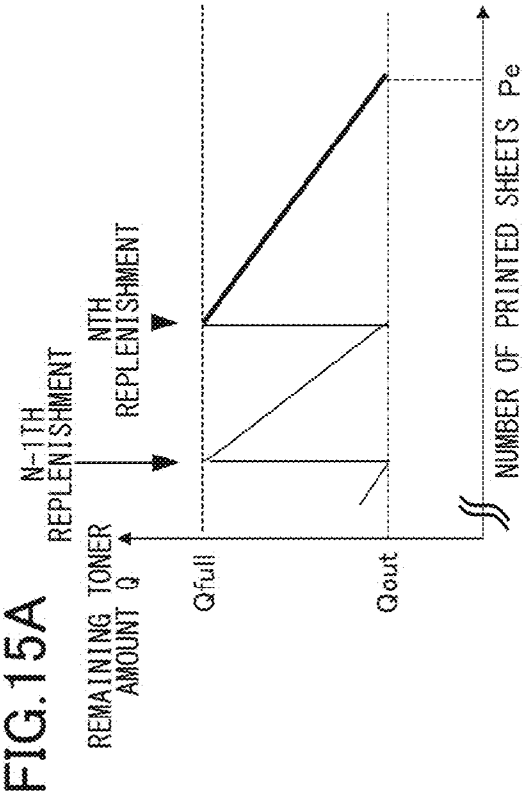
FIG. 15A is a graph showing an example of a transition in remaining toner amount in the second modification.
Figure 15B:
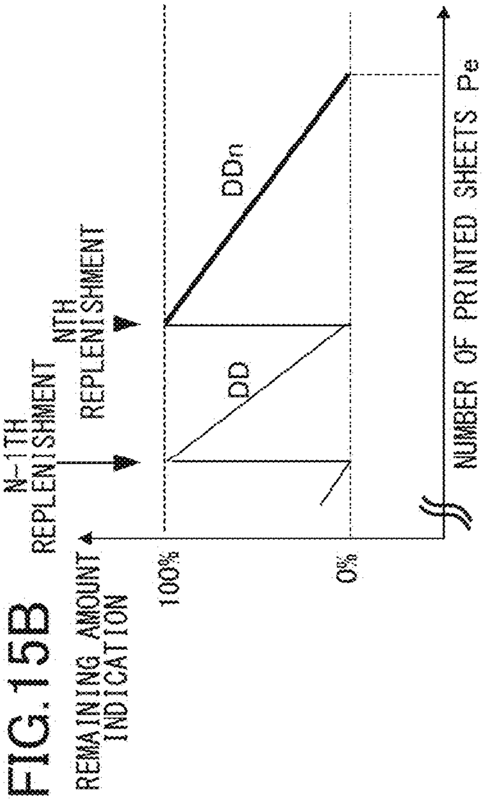
FIG. 15B is a graph showing an example of a transition in remaining toner amount indication in the second modification.

FIG. 15A illustrates a transition in remaining toner amount when an image (S13NO) having a large area S of a halftone region such as a full-surface halftone is continuously printed. When Nth toner replenishment is performed, the charge amount of toner on the developing roller 4 increases, and as a result, the toner consumption pace becomes slower than that before the toner replenishment. FIG. 15B illustrates a transition in remaining toner amount indication on the remaining amount display unit 400 in the same situation as in FIG. 15A. In FIGS. 15A and 15B, since an image having a large area S of a halftone region is printed, the value $k_n$ of the coefficient k is set to 0.5 times $k_{n-1}$. As a result, the rate (inclination DDn) at which the remaining toner amount calculated using the value $k_n$ of the coefficient k decreases after the toner replenishment is half the rate (inclination DD) at which the remaining toner amount calculated using the value $k_{n-1}$ of the coefficient k decreases before the toner replenishment.

By performing the above-described control, the remaining toner amount calculated based on the dot count value C is equal to or smaller than Qout (0%) at substantially the same timing as the number of printed sheets Pe at which the actual remaining toner amount Q is equal to or smaller than Qout. Therefore, even in a case where images including a large number of halftone images that are easily affected by the charge amount of toner, a toner replenishment notification can be performed at an appropriate timing.

Figure 15C:
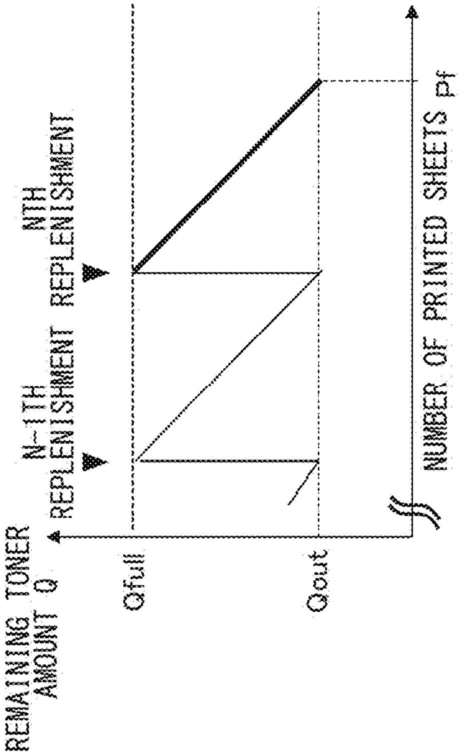
FIG. 15C is a graph showing an example of a transition in remaining toner amount in the second modification.
Figure 15D:
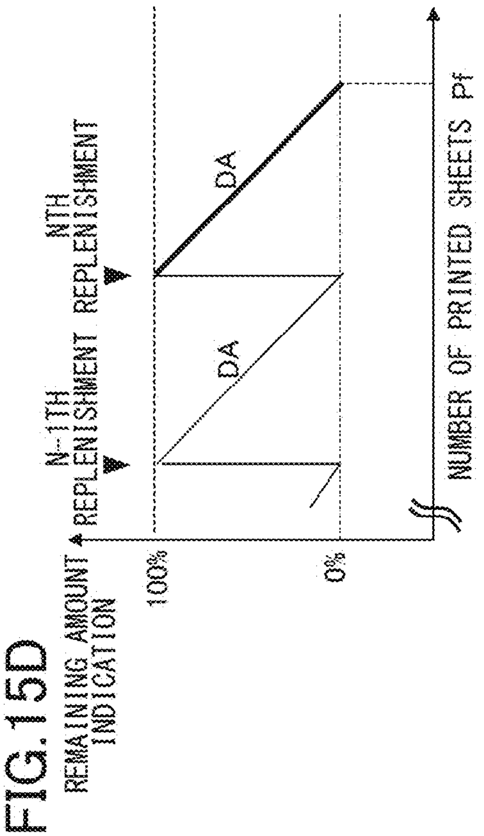
FIG. 15D is a graph showing an example of a transition in remaining toner amount indication in the second modification.

FIG. 15C illustrates a transition in remaining toner amount when an image including only text and with no halftone region is continuously printed. When Nth toner replenishment is performed, the charge amount of toner on the developing roller 4 increases, but the toner consumption pace hardly changes from before the toner replenishment. FIG. 15D illustrates a transition in remaining toner amount indication on the remaining amount display unit 400 in the same situation as in FIG. 15C. In FIGS. 15C and 15D, since an image not including a halftone region (S=0) is printed, the value $k_n$ of the coefficient k is set to a value equal to $k_{n-1}$. As a result, the rate (inclination DA) at which the remaining toner amount calculated using the value $k_n$ of the coefficient k decreases after the toner replenishment is equal to the rate (inclination DA) at which the remaining toner amount calculated using the value $k_{n-1}$ of the coefficient k decreases before the toner replenishment.

By performing the above-described control, the remaining toner amount calculated based on the dot count value C is equal to or smaller than Qout (0%) at substantially the same timing as the number of printed sheets Pf at which the actual remaining toner amount Q is equal to or smaller than Qout. Therefore, even in a case where an image that is hardly affected by the charge amount of toner (an image not including a halftone image) is printed, a toner replenishment notification can be performed at an appropriate timing.

In the embodiments and the modifications described above, there is a case where the change rate of the remaining toner amount indication per printed sheet before toner replenishment is different from the change rate of the remaining toner amount indication per printed sheet after toner replenishment (for example, the first embodiment in FIG. 9B). In order to obtain the change rate (the inclination Dn of the graph) of the remaining toner amount indication, for example, the remaining amount display panel 401 of FIGS. 7A to 7C or the gauge G1 or the numerical value G2 of FIG. 8 is monitored. When the change rate of the remaining toner amount indication is obtained, it is not necessary to continuously print images from 100% to 0% of the remaining toner amount. For example, it may be checked whether a change in remaining toner amount indication in a case where about 100 images are printed is different between before and after toner replenishment. In addition, it may be checked whether the number of printed sheets until the indication on the remaining amount display panel 401 of FIGS. 7A to 7C changes by one stage is different between before and after toner replenishment.

In the above description, it has been assumed that the toner (in-container toner) existing in the developing container 8 from before toner replenishment and the toner (replenished toner) replenished into the developing container 8 by toner replenishment are the same toner in a new state. Not limited thereto, the present technology can also be applied to a case where the in-container toner and the replenished toner are different toners. The toners being different means that at least one of a toner characteristic (e.g., particle size, viscoelasticity, shape, hardness, fluidity, charging performance, material, etc.), an additive (material, size, the number of parts added, strength added), a manufacturing method (suspension polymerization method, pulverization method, dissolution suspension method, and emulsion aggregation method), and the like is different.

When the types of the in-container toner and the replenished toner are different, the mixture of the plurality of types of toners in the developing container 8 may cause an image defect. At that time, toner may be further newly replenished as a method of recovering the image defect. A user may attempt recovery by newly replenishing toner, or a service engineer may newly replenish toner. Furthermore, as in the second embodiment, recovery may be attempted by changing latent image settings (settings of the charging voltage and the developing voltage).

To summarize the cases discussed so far, there may be a case where the in-container toner and the replenished toner are the same, a case where the in-container toner and the replenished toner are different in type, and a case where the in-container toner is a mixture of a plurality of types of toners and toner different in type from one or all of the plurality of types of toners is replenished. Further, there may be a case where the user or the service engineer performs only toner replenishment and a case where a latent image setting is changed after toner replenishment by detecting a replenishment operation, a memory tag, and manual setting of the user or the service engineer.

In any of the cases described above, the present technology can be applied, and the same advantages as those of the above-described embodiments can be obtained. That is, by changing the value of the coefficient k for calculating the toner consumption amount based on the dot count value when the toner replenishment is performed, the toner consumption amount calculation accuracy can be enhanced.

Further, in the above-described embodiments, the example has been described in which the coefficient k is changed in accordance with the change in toner consumption amount after the toner replenishment, but it may also be considered to change the image forming condition so that the toner consumption amount does not change between before and after the toner replenishment. Examples of the change of the image forming condition include correcting a y curve (tone curve), adjusting a line width/dot size, and changing a latent image setting. The correction of the y curve refers to correcting the relationship of the halftone density of the output data with respect to the halftone density of the input data in image processing for creating data for driving the exposing unit 10 from image data input from the outside. The adjustment of the line width/dot size refers to changing the line width of the thin line pattern and the size of each point of the dot pattern constituting the halftone. The change of the latent image setting refers to changing the difference (Vback) from the pre-exposure potential VD, the difference (Vcont) between the developing potential and the post-exposure potential VL, and the developing potential by adjusting the charging voltage, the developing voltage, the laser light amount, and the like.

By changing the image forming condition, it is possible to suppress a change in image density and a change in toner consumption amount with respect to the same image data between before and after toner replenishment, but it may be difficult to perform adjustment so that the image density and the toner consumption amount do not change at all. According to the present technology, even though it is difficult to cope by changing the image forming condition, the accuracy in calculating the toner consumption amount and the remaining toner amount can be improved, and it is possible to at least provide accurate remaining toner amount information to the user and notify the user of toner replenishment at an appropriate timing. Note that the present technology may be used in combination with a technology of changing image forming conditions in order to suppress a change in image density between before and after toner replenishment.

In the above-described embodiments, the monochrome printer has been described as an example, but the present technology can also be applied to a color printer that forms a color image using toners of a plurality of colors. In the color printer, a toner consumption amount and a remaining toner amount are calculated for each of the toners of the plurality of colors.

In addition, in the above-described embodiments, the direct transfer type image forming apparatus in which a toner image formed on the photosensitive drum 1 (photosensitive member) is directly transferred to the recording material P, which is a transfer object, has been described, but the present technology is also applicable to an intermediate transfer type image forming apparatus. In the intermediate transfer type, a toner image formed on the photosensitive drum 1 (photosensitive member) is primarily transferred to an intermediate transfer member as a transfer object, and then the toner image is secondarily transferred from the intermediate transfer member to the recording material P.

In the above-described embodiments, the configuration in which toner replenishment is performed in a state where the toner pack 40 (replenishing container) is attached to the attachment portion 57 has been exemplified. Not limited thereto, the present technology may be applied to an image forming apparatus having a configuration, for example, in which toner for replenishment is poured from a replenishing container that is not attached to the apparatus body through a replenishing port exposed to the outside of the apparatus body.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-044234, filed on Mar. 19, 2024, which is hereby incorporated by reference herein in its entirety.

What is claimed is:

1. An image forming apparatus comprising:

a photosensitive member;

a toner storage portion configured to store toner;

a developing member configured to bear the toner stored in the toner storage portion, supply the toner to the photosensitive member, and develop a latent image on the photosensitive member into a toner image;

an attachment portion to which a replenishing container containing toner is attached, the attachment portion being configured to allow toner replenishment from the replenishing container into the toner storage portion in a state where at least a part of the replenishing container is outside the image forming apparatus; and a control unit configured to calculate a toner consumption amount by multiplying a count value correlated with the number of pixels constituting the toner image by a coefficient, the control unit being configured to change a value of the coefficient in a case where the toner replenishment is performed.

2. The image forming apparatus according to claim 1, wherein the control unit is configured to set the value of the coefficient after the toner replenishment is performed to a value smaller than a value of the coefficient before the toner replenishment is performed.

3. The image forming apparatus according to claim 2, wherein an absolute value of an average charge amount of the toner borne on the developing member after the toner replenishment is performed is larger than an absolute value of an average charge amount of the toner borne on the developing member before the toner replenishment is performed.

4. The image forming apparatus according to claim 2, wherein the control unit is configured to decrease the value of the coefficient every time the toner replenishment is performed.

5. The image forming apparatus according to claim 1, wherein in a case where an image forming operation is repeatedly executed based on a same image data, the control unit is configured to change, when the toner replenishment is performed, the value of the coefficient so that a result of calculating a toner consumption amount consumed in the image forming operation after the toner replenishment is performed is smaller than a result of calculating a toner consumption amount consumed in the image forming operation before the toner replenishment is performed.

6. The image forming apparatus according to claim 1, wherein in a case where a value of the coefficient before current toner replenishment is performed is a first value, the control unit is configured to change the value of the coefficient to a second value smaller than the first value after the current toner replenishment is performed, and then change the value of the coefficient to a third value larger than the second value before next toner replenishment is performed.

7. The image forming apparatus according to claim 1, wherein the control unit is configured to set the value of the coefficient after the toner replenishment is performed to a value larger than a value of the coefficient before the toner replenishment is performed.

8. The image forming apparatus according to claim 1, further comprising:

a charging member;

a first voltage applying unit configured to apply a first voltage for charging a surface of the photosensitive member to the charging member; and a second voltage applying unit configured to apply a second voltage for developing the latent image to the developing member, wherein the control unit is configured to change at least one of the first voltage and the second voltage in a case where the toner replenishment is performed.

9. The image forming apparatus according to claim 8, wherein in a case where a surface potential of the photosensitive member after being charged by the charging member to which the first voltage is applied is a first potential, and a potential of the developing member to which the second voltage is applied is a second potential, the control unit is configured to change at least one of the first voltage and the second voltage such that a potential difference between the first potential and the second potential increases in a case where the toner replenishment is performed.

10. The image forming apparatus according to claim 9, wherein the control unit is configured to change at least one of the first voltage and the second voltage so that the potential difference increases after current toner replenishment is performed, and then change at least one of the first voltage and the second voltage so that the potential difference decreases before next toner replenishment is performed.

11. The image forming apparatus according to claim 1, wherein the control unit is configured to change the value of the coefficient to be used in calculating a toner consumption amount consumed in an image forming operation according to a size of a halftone region of an image formed by the image forming operation after the toner replenishment is performed.

12. The image forming apparatus according to claim 1, further comprising:

a transfer unit configured to transfer the toner image from the photosensitive member to a transfer object in a transfer portion, wherein the toner that has not been transferred to the transfer object in the transfer portion is collected in the toner storage portion by the developing member.

13. The image forming apparatus according to claim 1, wherein the control unit is configured to calculate a remaining toner amount in the toner storage portion based on the calculated toner consumption amount, and in a case where the remaining toner amount is equal to or smaller than a predetermined threshold, the control unit is configured to notify a user to prompt execution of the toner replenishment.

14. The image forming apparatus according to claim 1, wherein the control unit is configured to cause a display unit to display remaining amount information related to a remaining toner amount in the toner storage portion based on the toner consumption amount calculated using the count value and the coefficient.

15. The image forming apparatus according to claim 14, wherein the display unit is an operation panel included in the image forming apparatus, and the remaining amount information is displayed by displaying a screen on the operation panel.

16. The image forming apparatus according to claim 14, wherein the display unit includes a plurality of lamps provided on an outer surface of the image forming apparatus, and the remaining amount information is displayed by on/off of the plurality of lamps or by lighting modes of the plurality of lamps.

17. The image forming apparatus according to claim 1, further comprising:

a detection unit configured to detect attachment/detachment of the replenishing container to/from the attachment portion, wherein the control unit is configured to change the value of the coefficient based on a detection of the attachment/detachment of the replenishing container by the detection unit.

18. The image forming apparatus according to claim 1, further comprising:

an operation unit configured to receive an operation from a user, wherein the control unit is configured to change the value of the coefficient based on an input to the operation unit, the input indicating that the toner replenishment using the replenishing container has been completed.

19. The image forming apparatus according to claim 1, further comprising:

an exposing unit configured to expose the photosensitive member, wherein the control unit is configured to develop image data into a raster image, and drive the exposing unit based on the raster image so that the latent image is formed on the photosensitive member, and the count value is the number of dots constituting the raster image.

20. The image forming apparatus according to claim 1, further comprising:

an exposing unit including a light source and configured to expose the photosensitive member using light emitted from the light source, wherein the count value is a cumulative light emission time of the light source.

* * * * *